United States Patent
Rantala et al.

(10) Patent No.: US 7,643,717 B2
(45) Date of Patent: Jan. 5, 2010

(54) HYBRID ORGANIC-INORGANIC MATERIALS FOR WAVEGUIDES, OPTICAL DEVICES, AND OTHER APPLICATIONS

(75) Inventors: Juha T. Rantala, Oulu (FI); Arto L. T. Maaninen, Oulu (FI); T. Teemu T. Tormanen, Oulu (FI); Tiina J. Maaninen, Oulu (FI); Jarkko J. Pietikainen, Oulu (FI)

(73) Assignee: Silecs Oy, Espoo (FI)

( * ) Notice: Subject to any disclaimer, the term of this patent is extended or adjusted under 35 U.S.C. 154(b) by 1112 days.

(21) Appl. No.: 10/150,625

(22) Filed: May 17, 2002

(65) Prior Publication Data
US 2003/0235933 A1    Dec. 25, 2003

(51) Int. Cl.
*G02B 6/02* (2006.01)
*H01L 21/00* (2006.01)
(52) U.S. Cl. .................... 385/126; 385/128; 385/123
(58) Field of Classification Search ................ 385/129, 385/141
See application file for complete search history.

(56) References Cited

U.S. PATENT DOCUMENTS

| 6,144,795 | A  | * | 11/2000 | Dawes et al. ............... 385/141 |
| 7,043,133 | B2 | * | 5/2006  | Johnson et al. ............ 385/142 |
| 2004/0126072 | A1 | * | 7/2004 | Hoon Lee et al. ........... 385/122 |

* cited by examiner

*Primary Examiner*—Frank G Font
*Assistant Examiner*—Eric Wong
(74) *Attorney, Agent, or Firm*—Kubovcik & Kubovcik

(57) ABSTRACT

Waveguides are disclosed (and other devices and materials including but not limited to hybrid organic-inorganic coatings, passivation materials, glob top materials, underfill materials, materials for IC and other applications, microlenses and any of a wide variety of optical devices) that benefit by being formed of a novel hybrid organic-inorganic material. In one embodiment of the invention, a method for making a waveguide includes: forming a lower cladding layer on a substrate; forming a core layer after the lower cladding layer; and forming an upper cladding layer after the core layer; wherein the lower cladding layer, core layer and/or upper cladding layer comprises a hybrid organic-inorganic material—that has many desirable properties relating to stability, hydrophobicity, roughness, optical absorbance, polarization dependent loss, among others.

165 Claims, 8 Drawing Sheets

HYBRID ORGANIC-INORGANIC MATERIALS FOR WAVEGUIDES, OPTICAL DEVICES, AND OTHER APPLICATIONS

BACKGROUND OF THE INVENTION

Growing internet and data communications are resulting in the need for greater numbers and types of optical components within expanding optical networks. DWDM systems, or any system that utilizes light to transmit information, utilize a variety of components for creating, transmitting, manipulating and detecting light. Such optical device components, also referred to as optoelectronic or photonic components, often comprises at least a portion that is transmissive to light at particular wavelengths. Fibers and planar light guides are examples of passive light transmissive optical components within an optical network. However, light manipulators (components that modify, filter, amplify, etc. light within the optical network) also often have portions that are transmissive to light, as often do photodetectors and light emittors.

Regardless of the type of optical device component, it is usually desirable that a material is used that is highly transmissive to the wavelengths used to transmit information through the optical network. In addition to low optical absorbance, the material should preferably have low polarization dependent loss and have low birefringence and anisotropy, and low stress. It is also desirable that the material be easy to deposit or form, preferably at a high deposition rate and at a relatively low temperature. Once deposited or formed, it is desirable that the material can be easily patterned, preferably directly patterned without the need for photoresist and etching steps, and preferably patterned with small feature sizes if needed. Once patterned, the material should preferably have low surface and/or sidewall roughness.

It is also desirable that such materials be hydrophobic to avoid uptake of moisture (or other fluids) once installed and in use, and be stable with a relatively high glass transition temperature (not degrade or otherwise physically and/or chemically change upon further processing or when in use). The hydrophobicity of a material can be measured by the contact angle made by a drop of water (having a specific volume) on the material surface. Hydrophobicity is particularly desirable for waveguides and other optical devices that are deployed in potentially high humidity environments (or other environments where the device could be exposed to water or other liquids or gases that could be absorbed by or otherwise degrade the device).

Often, current materials used for making optical device components have only one or a few of the above-mentioned characteristics. For example, inorganic materials such as silica are relatively stable, have relatively high glass transition temperatures have relatively low optical loss. However, silica materials often require higher deposition temperatures (limiting substrates and components on the substrates) and have lower deposition rates and cannot be directly patterned. Organic materials such as polymers can be deposited at lower temperatures and at higher deposition rates, but are relatively unstable and have lower glass transition temperatures. What are needed are materials for optical device components that have a larger number of the preferred characteristics set forth above.

In the present invention, hybrid organic-inorganic materials are used for the various applications mentioned above, and others. The hybrid materials of the invention provide the benefits of inorganic materials (stability, glass transition temperature, optical profiles, etc.) while also providing the benefits of organic materials (ease of handling and deposition, etc.). Preferably, the hybrid materials of the invention have an inorganic backbone, such as one made of a metal or metalloid oxide three dimensional network, with organic substituents and cross linking groups (which can be partially or fully fluorinated).

SUMMARY OF THE INVENTION

The invention is directed to waveguides and other devices and materials (including but not limited to hybrid organic-inorganic coatings, passivation materials, glob top materials, underfill materials, dielectric materials for IC and other applications, microlenses and any of a wide variety of optical devices) that benefit by having both organic and inorganic components, among other things. In one embodiment of the invention, a method for making a waveguide comprises: forming a lower cladding layer on a substrate; forming a core layer after the lower cladding layer; and forming an upper cladding layer after the core layer; wherein the lower cladding layer, core layer and/or upper cladding layer comprises a hybrid organic-inorganic material.

In another embodiment of the invention, a waveguide is disclosed that comprises: a substrate; a lower cladding layer; a core layer; and an upper cladding layer; wherein the lower cladding layer, the core layer and/or the upper cladding layer comprises a hybrid organic-inorganic material.

In a further embodiment of the invention, a waveguide, comprises: a substrate; and a waveguide layer, wherein the waveguide layer comprises a hybrid organic-inorganic material.

And, in yet another embodiment of the invention, an optical device component is disclosed that comprises: a substrate; and a waveguide layer, wherein the waveguide layer comprises a hybrid organic-inorganic material.

The waveguide layer is preferably a waveguide core that has been patterned and can have thereon an upper cladding layer (which can be a light transmissive substrate or a deposited material having a different refractive index than the waveguide layer). If the lower substrate is not used as a lower cladding layer, then a lower cladding layer is preferably present between the waveguide layer and the substrate. The waveguide layer could also be a cladding layer instead of a core.

In a further embodiment of the invention, a method for making a waveguide, comprises: forming a core layer and an upper cladding layer on a substrate; wherein the core layer and/or upper cladding layer comprises a hybrid organic-inorganic material.

In another embodiment of the invention, a substrate of sufficient refractive index compared to the core material is used such that a lower cladding layer is not needed. In this embodiment, a method for making a waveguide is disclosed that comprises: forming a core layer and an upper cladding layer on a substrate; wherein the core layer and/or upper cladding layer comprises a hybrid organic-inorganic material. In this embodiment, the substrate is preferably a light transmissive substrate such as plastic, glass, quartz or sapphire.

In still further embodiments of the invention, the hybrid material forms part of other devices and materials (including but not limited to hybrid coatings, passivation materials, glob top materials, underfill materials, dielectric materials for IC and other applications, microlenses and any of a wide variety of optical devices). These other applications allow for a layer or complete device that has benefits of both organic and inorganic materials.

DESCRIPTION OF THE PREFERRED EMBODIMENTS

Compounds

Figure 1:
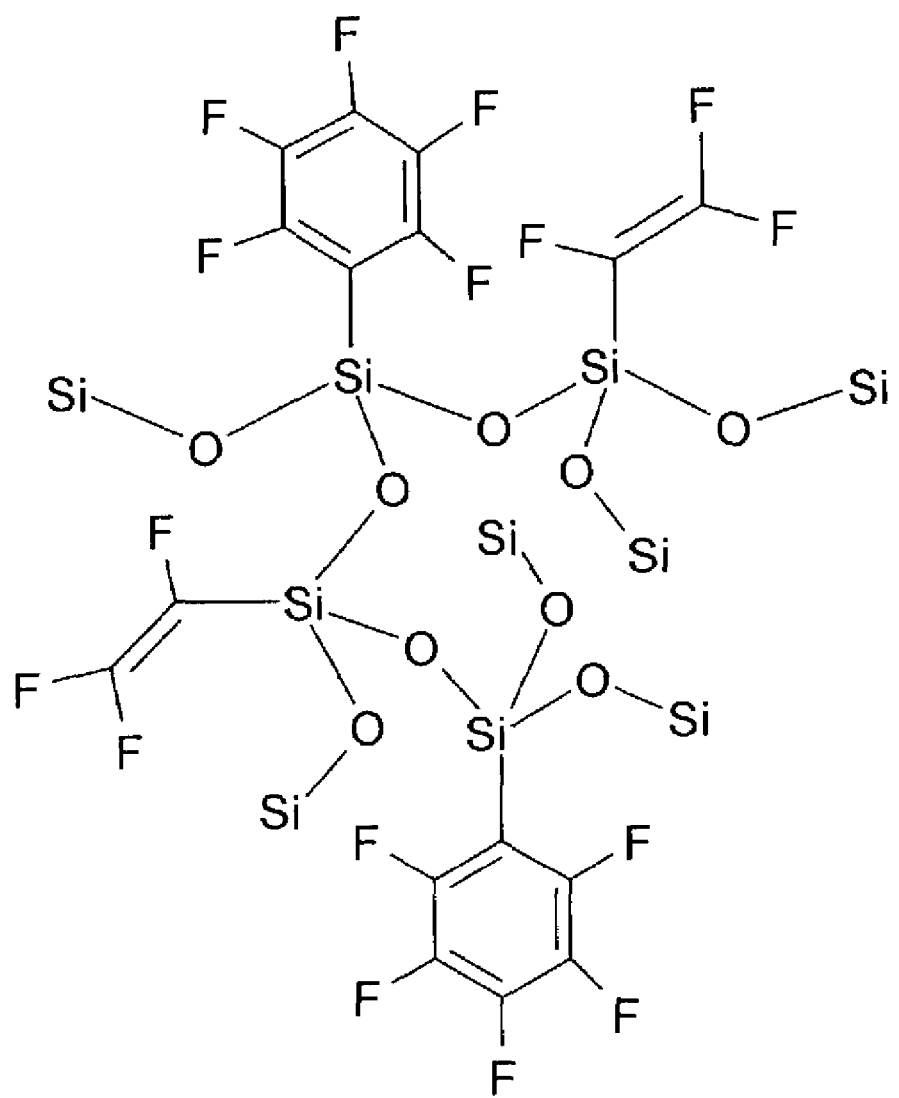
FIG. 1 illustrates a poly(pentafluorophenyltrifluorovinylsiloxane) prepared by hydrolysis and condensation of hybrid organic-inorganic compounds and used in the method of the present invention.

In this section, compounds are described that can be hydrolyzed and condensed (alone or with one or more other compounds) into a hybrid material having a molecular weight of from 500 to 10,000 (preferably from 500 to 5000, or more preferably 500 to 3000), which material can be deposited by spin-on, spray coating, dip coating, or the like. Such compounds are preferably partially or fully fluorinated, though not necessarily so. The compounds will preferably have an element M selected from groups 3-6 or 13-16 of the periodic table, which element is preferably tri-, tetra- or penta-valent, and more preferably tetravalent, such as those elements selected from group 14 of the periodic table. Connected to this element M are from three to five substituents, wherein from one to three of these substituents are organic groups to be discussed further below, with the remainder being a halogen or an alkoxy group.

Compound Example I

A compound is provided of the general formula: $R^1MOR^3{}_3$, where $R^1$ is any partially or fully fluorinated organic group (preferably a partially or fully fluorinated aryl, alkenyl, alkynyl or alkyl group), where M is an element selected from column 14 of the periodic table, and where $OR^3$ is an alkoxy group—except where M is Si, $R^1$ is perfluorinated phenyl or perfluorinated vinyl, and $OR^3$ is ethoxy, which, though not novel per se, can be part of one of the novel methods for making the materials of the invention as will be discussed further below. $R^1$ can have an inorganic component, though if so, a portion should preferably be a partially or fully fluorinated organic component. In a more preferred example of this, $R^1$ comprises a double bond that is capable of physical alteration or degradation in the presence of an electron beam, or electromagnetic radiation and a photoinitiator (or sensitizer, photoacid or thermal initiator—to be discussed further below). In this example, $R^1$ could be an alkenyl group such as a vinyl group, or could be an epoxy or acrylate group, that is preferably partially or fully fluorinated. Such a group, as will be discussed further herein, can allow for crosslinking upon application of an electron beam or preferably electromagnetic radiation (e.g. directing ultraviolet light through a mask with the material comprising a photoinitiator). In the alternative, $R^1$ could be an organic group that is (or a hybrid organic-inorganic group that comprises) a single or multi ring structure (an "aryl group") or an alkyl group of any length, such as from 1 to 14 carbon atoms or longer (preferably 4-10)—the alkyl group capable of being a straight or branched chain. If $R^1$ is a ring structure, or a carbon chain of sufficient length (e.g. 4 (or 5) or more carbons), then such an $R^1$ group can provide bulk to the final material once hydrolyzed, condensed and deposited on a substrate. If $R^1$ is a ring structure, whether single ring or multi ring, it can have substituents thereon, fluorinated, though not necessarily, such as alkyl or alkenyl substituents (preferably from 1 to 5 carbons), and where the substituents on the ring structure can be at from 1 to 3 locations around the ring. $R^1$ can be a 4 to 8 sided ring structure (preferably 5 or 6 sided) which ring structure could comprise N or O. R1 could comprise nitrogen, or $R^1$ can also have an oxygen component, such as a carboxylate group (e.g. acrylate, butenecarboxylate, propenecarboxylate, etc.).

In the example above, in $R^1MOR^3{}_3$, M can be a tetravalent element from column 14 of the periodic table (e.g. Si or Ge), or a tetravalent element from column 16—e.g. Se (or a tetravalent early transition metal—such as titanium or, zirconium). Also, $OR^3$ is an alkoxy group, though preferably one having from 1 to 4 carbon atoms (longer alkoxy groups can be used, but are more expensive). Specific examples include:

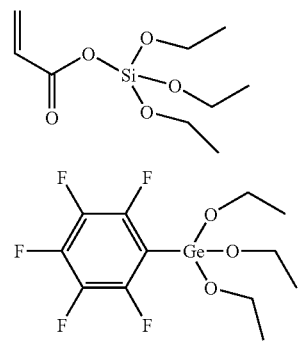

Acryltriethoxysilane Pentafluorophenyltriethoxygermane

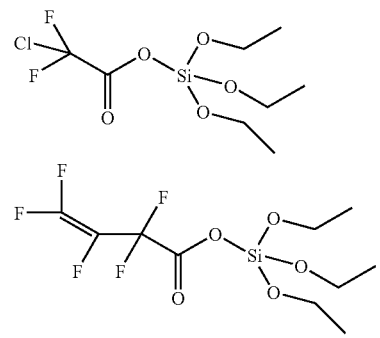

Chlorodifluoroacetic acid, triethoxy silyl ester
Perfluoro-3-butene acid, triethoxysilyl ester

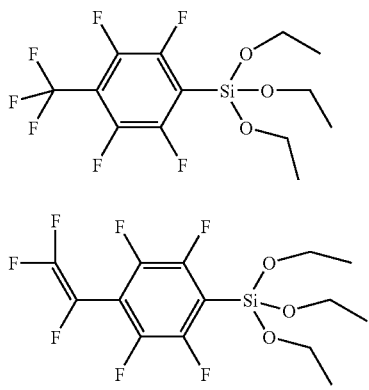
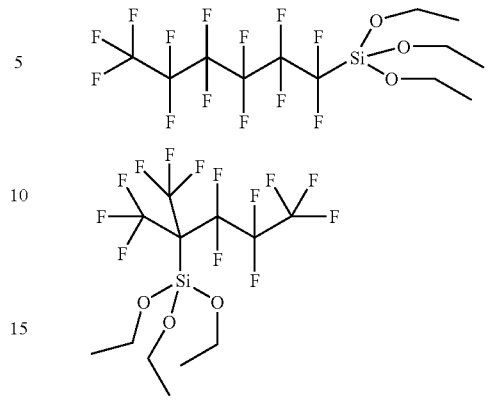

Heptafluorotoluenetriethoxysilane 4-triethoxysilyl perfluorostyrene

Perfluorohexanetriethoxysilane
2-trifluoromethyl-2-triethoxysilyl perfluoro pentane Compound Example II In yet another compound example, a compound is provided of the general formula: $R^1MOR^3{}_2X$, where $R^1$ is any partially or fully fluorinated organic group (preferably a partially or fully fluorinated aryl, alkenyl, alkynyl or alkyl group) as set forth above, where M is an element selected from group 14 of the periodic table as mentioned above, where X is a halogen, and where $OR^3$ is an alkoxy group as above. X in this example is preferably F, Cl, Br or I, and more preferably Cl or Br. Specific examples of compounds within this category include

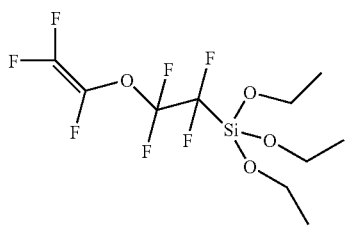
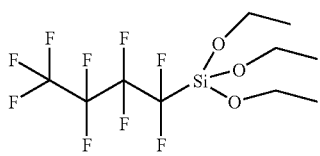

Tetrafluoroethyltrifluorovinyl ether triethoxysilane
perfluorobutanetriethoxysilane

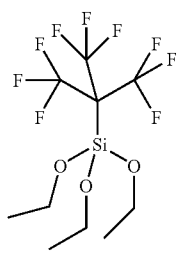
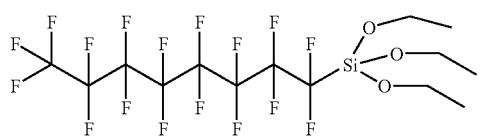

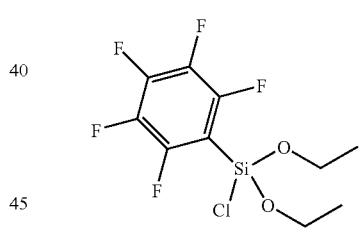
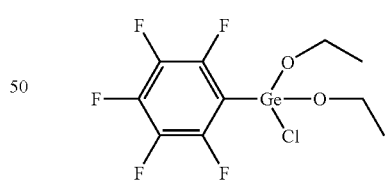
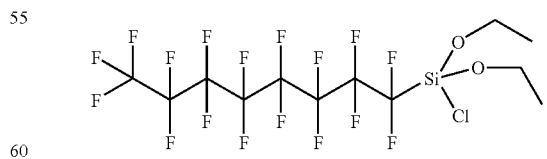
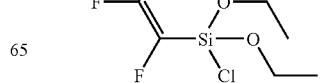

Perfluoro-t-butyl triethoxysilane
Perfluorooctyltriethoxysilane

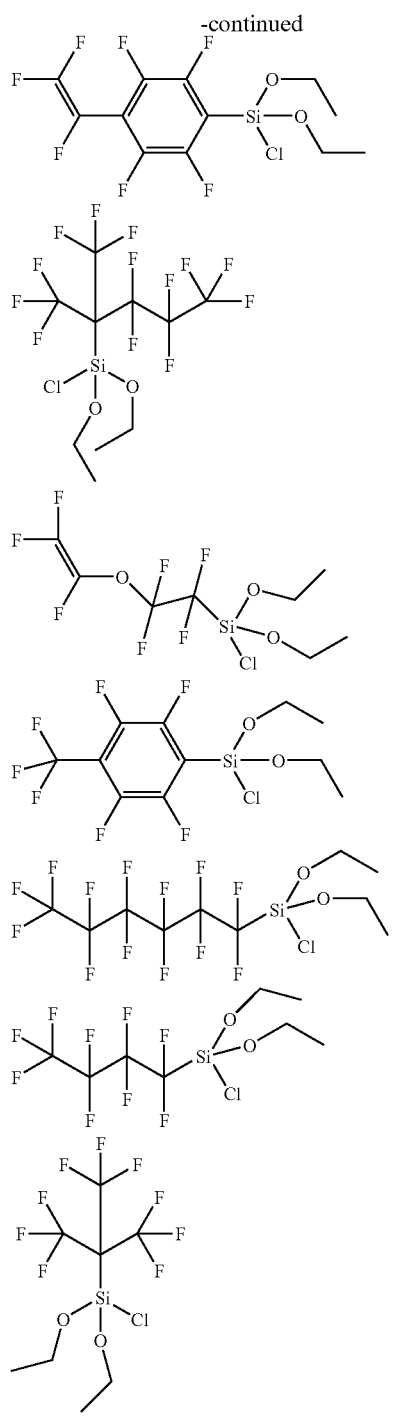

Compound Example III

In another compound example, a compound is provided of the general formula: $R^1MX_2OR^3$, where $R^1$ is any partially or fully fluorinated organic group (preferably a partially or fully fluorinated aryl, alkenyl, alkynyl or alkyl group) as set forth above, where M is an element selected from group 14 of the periodic table as mentioned above, where $OR^3$ is an alkoxy group as above, and where X is a halogen as above—Except where M is Si, $R^1$ is perfluorinated phenyl, X is Cl, and $OR^3$ is ethoxy, which, though not novel per se, is novel when used as part of the methods for making the materials of the invention as will be discussed further below. Specific examples within this category include

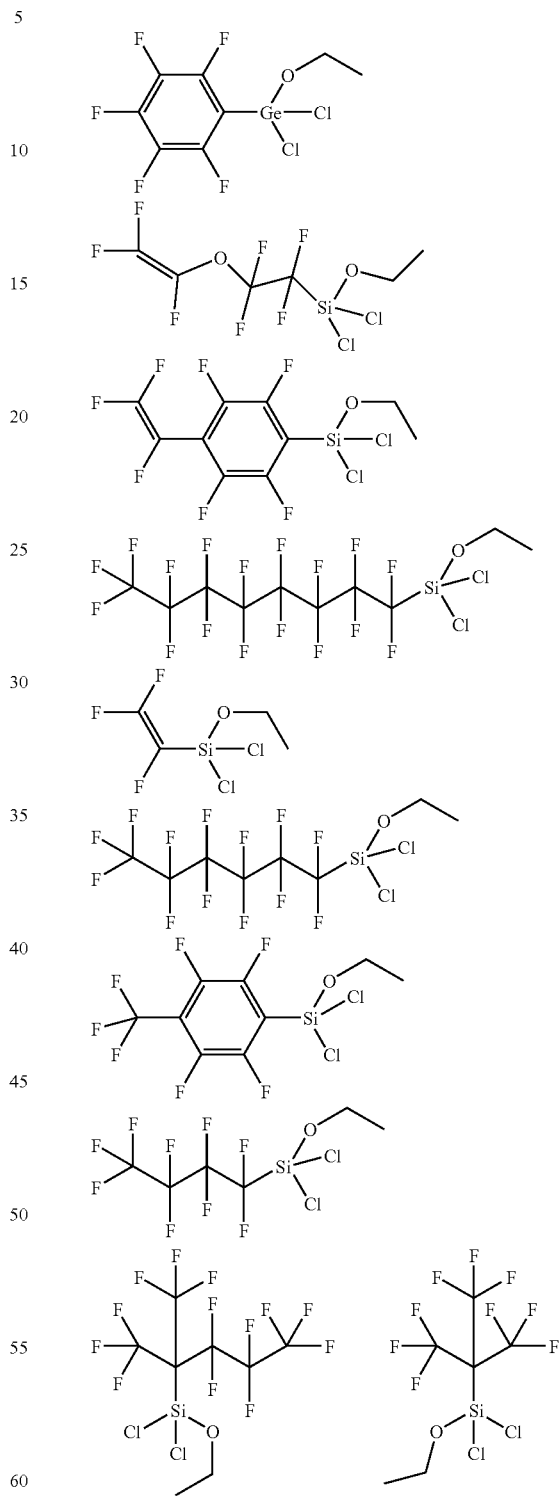

Compound Example IV

In a further compound example, a compound is provided of the general formula: $R^1MX_3$, where $R^1$ is any partially or fully fluorinated organic group (preferably a partially or fully fluorinated aryl, alkenyl, alkynyl or alkyl group) as set forth above, where M is an element selected from group 14 of the periodic table as mentioned above, and where X is a halogen as above—Except where M is Si, $R^1$ is perfluorinated phenyl, perfluorinated methyl or perfluorinated vinyl, and X is Cl, which, though not novel per se, are novel when used as part of the methods for making the materials of the invention as will be discussed further below. (If M is Si and X is Cl, some of these novel trichlorosilanes could be used for forming self assembled monolayers for making a surface hydrophobic, preferably by application in the vapor phase to a surface made of silicon and having OH end groups and moisture.) Specific examples within this category include

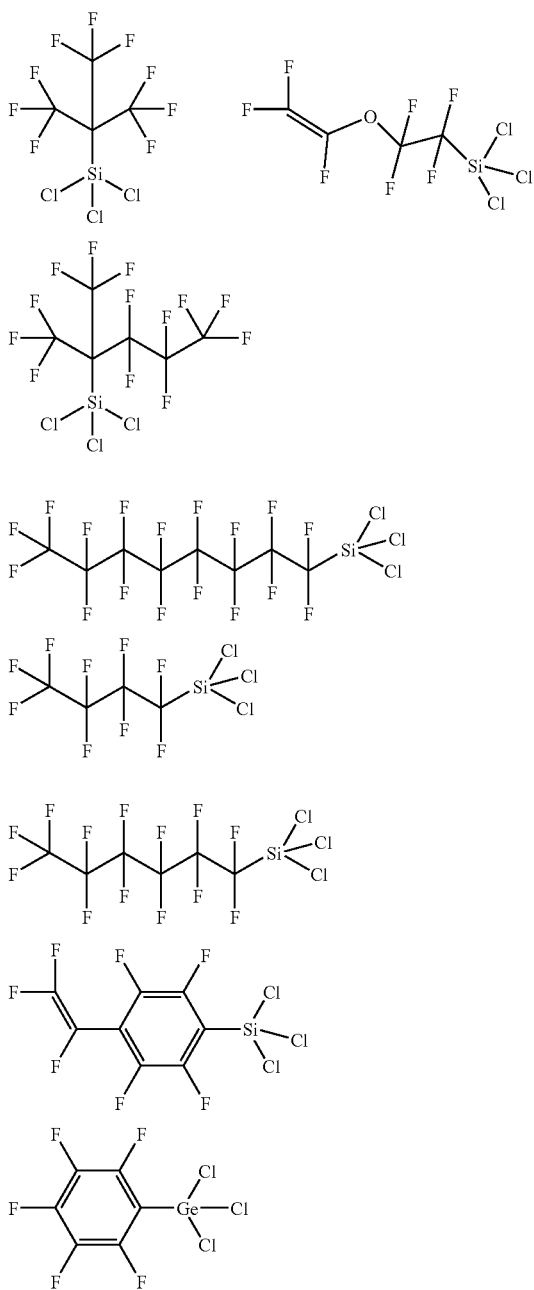

-continued

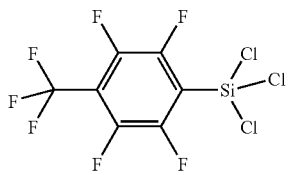

Compound Example V

In yet another compound example, a compound is provided of the general formula: $R^1R^2MOR^3{}_2$, where $R^1$ is any partially or fully fluorinated organic group (preferably a partially or fully fluorinated aryl, alkenyl, alkynyl or alkyl group) as set forth above with respect to $R^1$, $R^2$ is any partially or fully fluorinated organic group (preferably a partially or fully fluorinated aryl, alkenyl, alkynyl or alkyl group) as set forth above with respect to $R^1$, or any such organic groups nonfluorinated, and where $R^1$ and $R^2$ are the same or different from each other, where M is an element selected from group 14 of the periodic table as mentioned above, and where $OR^3$ is an alkoxy group as above—except where M is Si, $OR^3$ is ethoxy and $R^1$ and $R^2$ are perfluorinated phenyl groups, which compound is not novel per se, but is novel when used as part of the methods for making materials of the invention as set forth below. Specific examples within this category include:

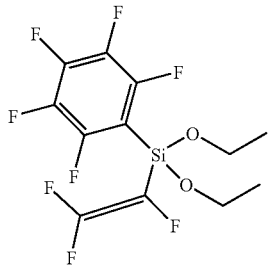

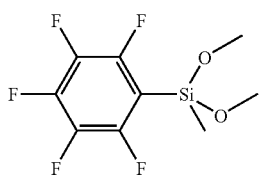

Pentafluorophenyltrifluorovinyldiethoxy-Methylpentafluorophenyldimethoxysilane silane

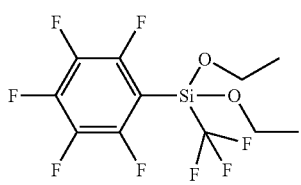

-continued

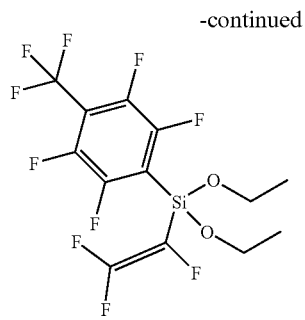

Pentafluorophenyltrifluoromethyl Perfluorotoluenetrifluorovinyldiethoxydiethoxysilane silane

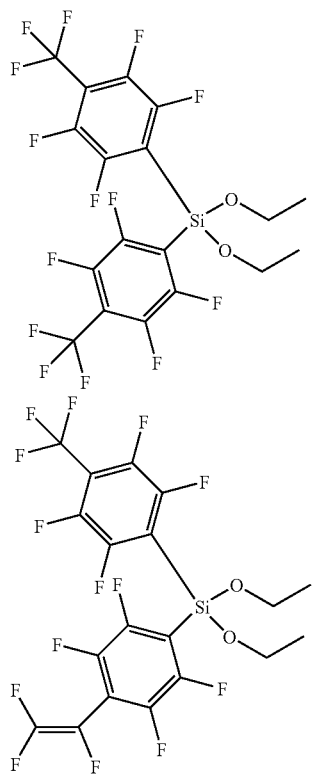

Di(perfluorotoluene)diethoxysilane
Perfluorostyreneperfluorotoluenediethoxysilane

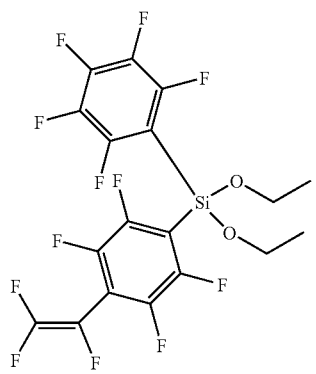

-continued

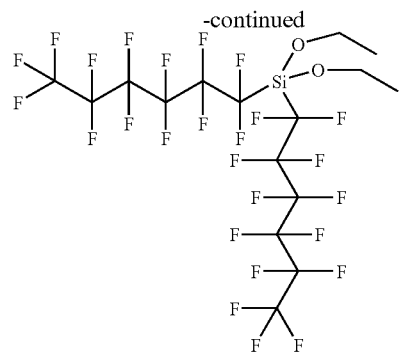

Pentafluorophenylperfluorostyryl-Bis(perfluorohexane)diethoxysilane diethoxysilane

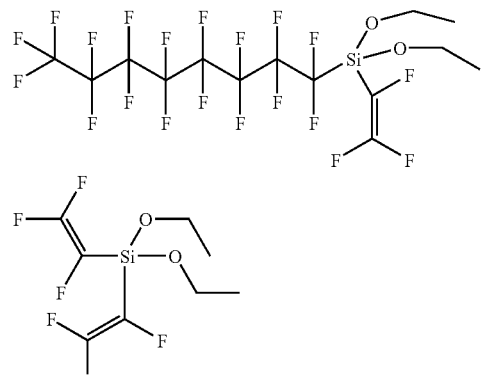

Perfluorooctyltrifluorovinyldiethoxysilane
Bis(trifluorovinyl)diethoxysilane

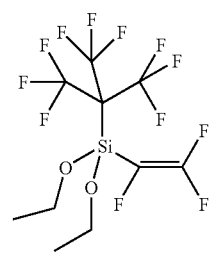

Perfluoro(t-butyl)trifluorovinyldiethoxysilane

Compound Example VI

In another compound example, a compound is provided of the general formula: $R^1R^2MXOR^3$, where $R^1$ is any partially or fully fluorinated organic group (preferably a partially or fully fluorinated aryl, alkenyl, alkynyl or alkyl group) as set forth above with respect to $R^1$, $R^2$ is any partially or fully fluorinated organic group (preferably a partially or fully fluorinated aryl, alkenyl, alkynyl or alkyl group) as set forth above with respect to $R^1$, or any such organic groups nonfluorinated, and where $R^1$ and $R^2$ are the same or different from each other, where M is an element selected from group 14 of the periodic table as mentioned above, where $OR^3$ is an alkoxy group as above, and where X is a halogen. $R^1$ and $R^2$ can be the same or different from each other. Specific examples within this category include:
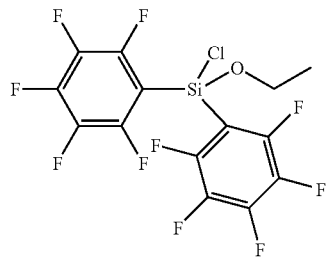
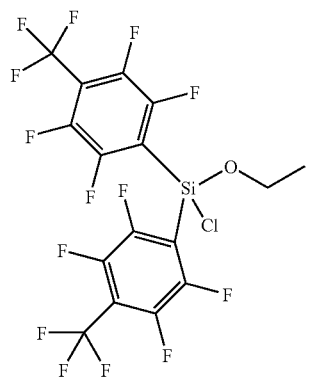
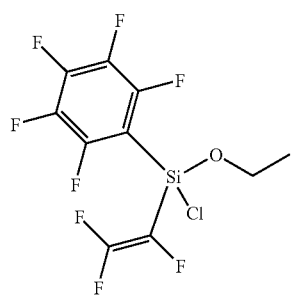
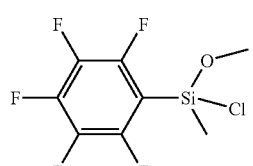
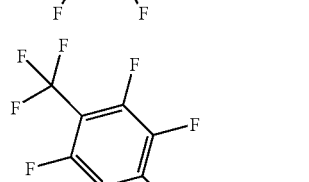
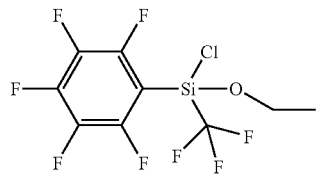
-continued
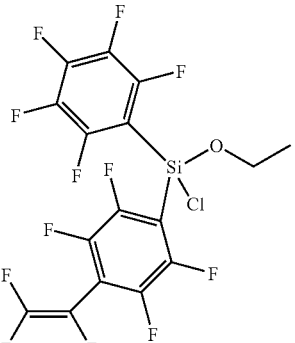
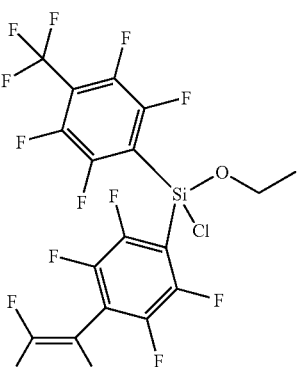
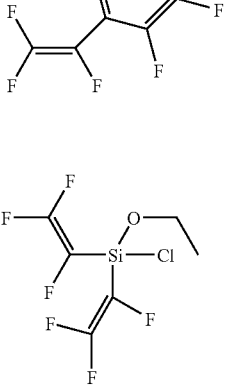
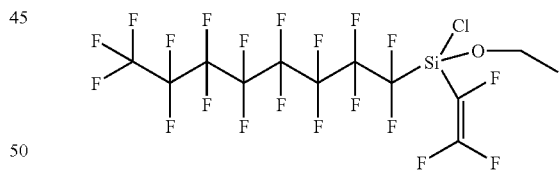
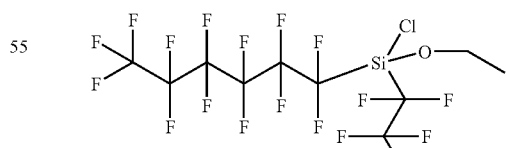

-continued

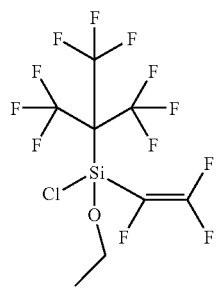

Compound Example VII

In a further compound example, a compound is provided of the general formula: $R^1R^2MX_2$, where $R^1$ is any partially or fully fluorinated organic group (preferably a partially or fully fluorinated aryl, alkenyl, alkynyl or alkyl group) as set forth above with respect to $R^1$, $R^2$ is any partially or fully fluorinated organic group (preferably a partially or fully fluorinated aryl, alkenyl, alkynyl or alkyl group) as set forth above with respect to $R^1$, or any such organic groups nonfluorinated, and where $R^1$ and $R^2$ are the same or different from each other, where M is an element selected from group 14 of the periodic table as mentioned above, and where X is a halogen as above—Except where M is Si, $R^1$ and $R^2$ are perfluorinated phenyl, and X is Cl, which, though not novel per se, is novel when used as part of the methods for making the materials of the invention as will be discussed further below. Specific examples within this category include:

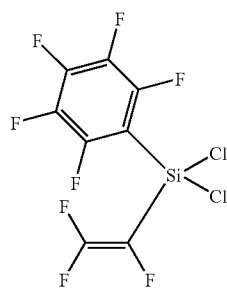
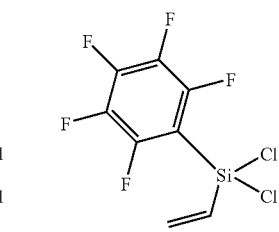
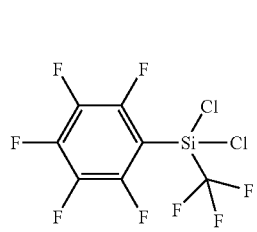
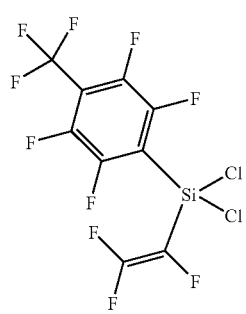

-continued

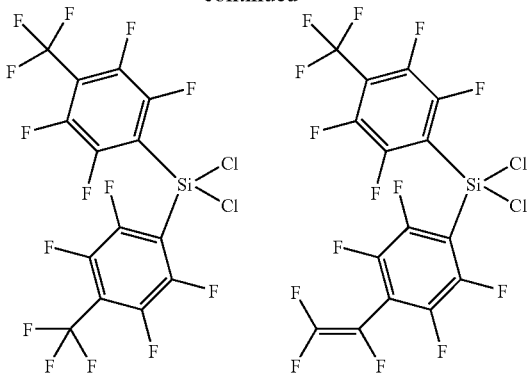
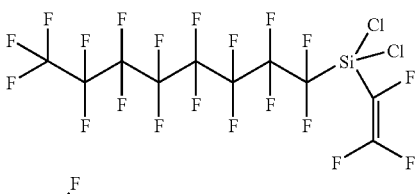
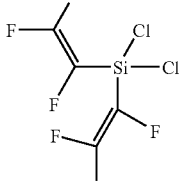
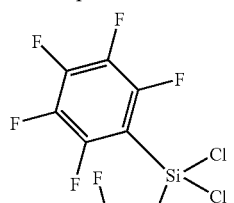
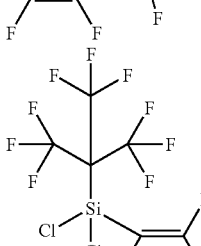
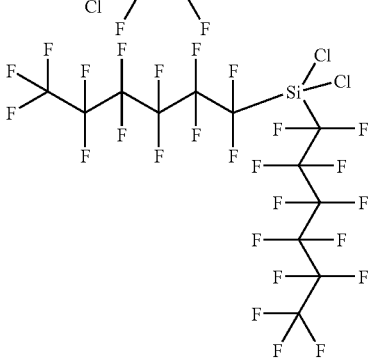

As Compounds V-VII have two organic groups, they can be formed by various combinations of Methods A, B and/or C (described in further detail below).

Compound VIII

In a further compound example, a compound is provided of the general formula: $R^1R^2R^3MOR^3$, where $R^1$, $R^2$ and $R^3$ are independently an aryl, alkenyl, alkynyl or alkyl group) as set forth above with respect to $R^1$ and $R^2$, and where $R^1$, $R^2$ and $R^3$ can each be the same or different from each other (and preferably at least one of where $R^1$, $R^2$ and $R^3$ is partially or fully fluorinated), where M is preferably an element selected from group 14 of the periodic table as above, and where $OR^3$ is an alkoxy group as above. One example is

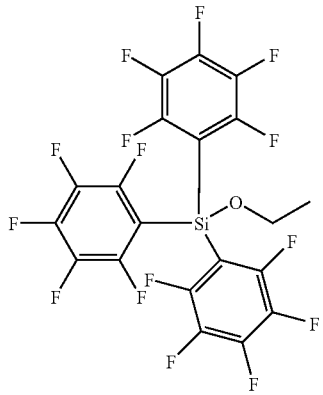

though the organic groups need not each be the same as in this example, and need not each be fluorinated (though preferably at least one of the organic groups is fluorinated).

Compound IX

In another compound example, a compound is provided of the general formula: $R^1R^2R^3MX$, where $R^1$, $R^2$ and $R^3$ are independently an aryl, alkenyl, alkynyl or alkyl group) as set forth above with respect to $R^1$ and $R^2$, and where $R^1$, $R^2$ and $R^3$ can each be the same or different from each other (and preferably at least one of where $R^1$, $R^2$ and $R^3$ is partially or fully fluorinated), where M is preferably an element selected from group 14 of the periodic table as above, and where X is a halogen as above. One example is:

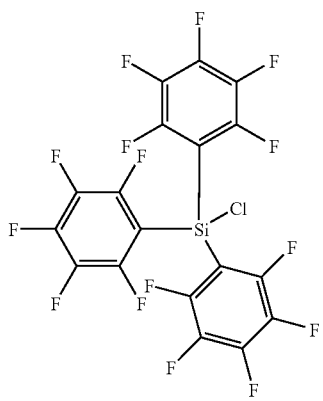

As Compounds VIII and IX have three organic groups, they can be formed by various combinations of Methods A, B and/or C (which methods are described in further detail below).

Other Compounds

Additional compounds for making the materials of the invention include those having the general formula $R^1MHX_2$ where $R^1$, M and X are as above and H is hydrogen. One example is:

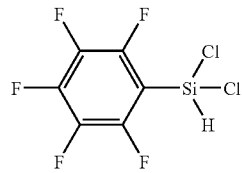

Other examples, where the fluorinated phenyl group is replaced with a substituted phenyl, fluorinated alkyl, vinyl, etc. are possible.

It should be noted that M in the compound formula examples above need not be tetravalent. M can also have other valencies, though preferably tri- or penta-valent. Examples would include early transition metals in group 3 or 5 of the periodic table (e.g. Y, V or Ta), or elements in columns 13 (column headed by B) or 15 (column headed by N), such as B, Al or As. In such situations, the compounds above would have one fewer or one additional alkoxy ($OR^3$), halogen (X) or an organic group ($R^1$ or $R^2$ independently from the other organic group(s)). Examples include $R^1MOR^3X$, $R^1MOR^3{}_2$, $R^1MX_2$, $R^1R^2MX$, $R^1R^2MOR^3$, where M is a trivalent early transition metal (or similar examples with five substituents selected from $R^1$ and/or $R^2$ groups, as well as alkoxy and halogen groups for pentavalent elements (including metalloids or transition metals). Such compounds could have the formula $R1_{3-m}MOR3_m$, $R1_{5-m}MOR3_m$, $R2R1_{4-m}MOR3_m$ or $R2R1_{4-m}MOR3_m$. If such tri- or penta-valent elements are used, such a compound would preferably be hydrolyzed and condensed as a dopant, rather than as the main portion of the material at the time of hydrolysis and condensation (likewise with non-silicon tetravalent elements that form compounds in accordance with the tetravalent examples above, such as germanium compounds).

It should also be noted that the structures illustrated above are exemplary only, as other ring structures (3 sided—e.g. epoxy, or 4 to 8 sided—preferably 5 or 6 sided) are possible, which structures can include nitrogen or oxygen in or bound the ring. The aryl group can have from 1 to 3 substitutents, such as one or more methyl, ethyl, ally, vinyl or other substituents—that can be fluorinated or not. Also, carbon chain R groups can include oxygen (e.g. carboxylate) or nitrogen, or sulpher. If an alkyl group is bound to the silicon (or other M group), it can have from 1 to 4 carbons (e.g. a C2+ straight or C3+ branched chain), or up to 14 carbons (or more)—if used as a bulk enhancing group for later hydrolysis and deposition, 4 or more carbons are preferable. These aryl groups can be fully or partially fluorinated, as can alkenyl or alkynyl groups if used.

Methods of Making the Compounds for Later Hydrolysis and Condensation:

In a number of the following examples of methods for making the materials of the invention, "M" is silicon, $OR^3$ is ethoxy, and X is Cl. However, as noted above, other alkoxy groups could easily be used (methoxy, propoxy, etc.), and other group 3-5 or 13-16 elements could be used in place of silicon and other halogens in place of chlorine. Starting materials can vary from tetraethoxy silane, to ethoxy silanes having one or more organic groups bound to the silicon, to chorosilanes having one or more chlorine groups and/or one or more organic groups, as well as starting materials having chlorine and alkoxy groups and with one or more organic groups. Any compound examples within Compounds I-TX above could be used as starting materials—or could be intermediate or final compounds as will be seen below. For example, trifluorovinyltriethoxysilane could be a final compound resulting from reacting a particular trifluorovinyl compound with tetraethoxysilane, or trifluorovinylsilane could be a starting material that, when reacted with a particular pentafluorophenyl compound, results in pentafluorophenyltrifluorovinyldiethoxysilane. As mentioned above, it is also preferred that any organic groups that are part of the starting material or are "added" by chemical reaction to become part of the compound as set forth below, are partially or fully fluorinated (or fully or partially deuterated), though such is not necessary as will also be seen below.

One example of a method for making the materials of the present invention comprises providing a compound $R^1_{4-q}MOR^3_q$ where M is selected from group 14 of the periodic table, $OR^3$ is an alkoxy group, $R^1$ is an alkyl, alkenyl, aryl or alkynyl, and q is from 2 to 4; reacting the compound $R^1_{4-q}MOR^3_q$ with either a) Mg and $R^2X^2$ where $X^2$ is Cl, Br or I and $R^2$ is an alkyl, alkenyl, aryl or alkynyl group, or b) reacting with $R^2X^1$ where $R^2$ is an alkyl, alkenyl, aryl or alkynyl group and wherein $R^2$ is fully or partially fluorinated or deuterated and $X^1$ is an element from group 1 of the periodic table; so as to replace one of the $OR^3$ groups in $R^1_{4-q}MOR^3_q$ so as to form $R^1_{4-q}R^2MOR^3_{q-1}$.

The starting material preferably has 1 or 2 (or no) organic groups ($R^1$) bound to the group 14 element "M", which organic groups may or may not comprise fluorine, with the remaining groups bound to M being alkoxy groups. An additional preferably fluorinated (partially of fully) organic group becomes bound to the group 14 element by one of a number of reactions. One method (Method A) involves reacting the starting material with magnesium and a compound having the desired organic group ($R^2$) bound to a halogen $X^2$ (preferably Cl, Br or I)—namely $R^2X^2$, which reaction replaces one of the alkoxy groups with the organic group $R^2$. In the above example, a single alkoxy group is replaced, however, depending upon the molar ratios of starting material to $R^2X^2$ and Mg, more than one alkoxy group can be replaced with an $R^2$ organic group. In one example of the above, a tetraethoxysilane, $MOR^3_4$ is reacted with a compound $R^2X_2$ where $R^2$ is a preferably fluorinated alkyl, aryl, alkenyl or alkynyl group and $X^2$ is preferably Br or I, so as to form $R^2MOR^3_3$ In another example, $R^1MOR^3_3$ is reacted with $R^2X^2$ so as to form $R^1R^2MOR^3_2$. This group of reactions can be referred to as: reacting the starting material $R^1_{4-q}MOR^3_q$ with $R^2X^2$ where $R^2$ is a preferably fluorinated alkyl, aryl, alkenyl or alkynyl group and $X^2$ is preferably Br or I, so as to form $R^1_{4-q}R^2MOR^3_{q-1}$.

This method A can be described as a method comprising reacting a compound of the general formula $R^1_{4-m}MOR^3_m$, wherein m is an integer from 2 to 4, OR is an alkoxy, and M is an element selected from group 14 of the periodic table; with a compound of the general formula $R^2X^2$+Mg, wherein $X^2$ is Br or I, where $R^1$ and $R^2$ are independently selected from alkyl, alkenyl, aryl or alkynyl, and wherein at least one of $R^1$ and $R^2$ is partially or fully fluorinated, so as to make a compound of the general formula $R^2MR^1_{3-n}OR^3_n$, wherein n is an integer from 1 to 3.

An alternate to the above method (Method B) is to react the same starting materials ($R^1_{4-q}MOR^3_q$) with a compound $R^2X^1$ where, as above, $R^2$ is an alkyl, alkenyl, aryl or alkynyl group and wherein $R^2$ is fully or partially fluorinated or deuterated and $X^1$ is an element from group 1 of the periodic table; so as to replace an $OR^3$ group in $R^1_{4-q}MOR^3_q$ to form $R_{14-q}R^2MOR^3_{q-1}$. In this example, $X^1$ is an element from group 1 of the periodic table, and is preferably Na, Li or K (more preferably Na or Li). In one example of the above, a tetraethoxysilane, $MOR^3_4$ is reacted with a compound $R^2X^1$ where $R^2$ is a preferably fluorinated alkyl, aryl, alkenyl or alkynyl group and $X^1$ is preferably an element from group I of the periodic table, so as to form $R^2MOR^3_3$ In another example, $R^1MOR^3_3$ is reacted with $R^2X^1$ so as to form $R^1R^2MOR^3_2$.

This method B can be described as a method comprising reacting a compound of the general formula $R1_{4-m}MOR3_m$ wherein m is an integer from 2 to 4, R1 is selected from alkyl, alkenyl, aryl, or alkyl, alkenyl or aryl, and wherein R1 is nonfluorinated, or fully or partially fluorinated, OR3 is alkoxy, and M is an element selected from group 14 of the periodic table; with a compound of the general formula R2M1, wherein R2 is selected from alkyl, alkenyl, aryl, alkynyl, and wherein R2 is at least partially fluorinated; and M1 is an element from group I of the periodic table; so as to make a compound of the general formula $R1_{4-m}MOR3_{m-1}R2$.

A modification (Method C) of the aforementioned (Method B), is to react the starting material ($R^1_{4-q}MOR^3_q$) with a halogen or halogen compound so as to replace one or more of the $OR^3$ groups with a halogen group due to reaction with the halogen or halogen compound. The halogen or halogen compound can be any suitable material such as hydrobromic acid, thionylbromide, hydrochloric acid, chlorine, bromine, thionylchloride or sulfurylchloride and the like. Depending upon the ratio of halogen or halogen compound to starting material (and other parameters such as reaction time and/or temperature), one or more alkoxy groups can be replaced by a halogen group—though in most examples, a single alkoxy group or all alkoxy groups will be replaced. If a single alkoxy group is replaced, then the starting material $R^1_{4-q}MOR^3_q$ becomes $R^1_{4-q}MOR^3_{q-1}X^3$ where $X^3$ is a halogen from the halogen or halogen compound reacted with the starting material (or simply begin with starting material $R^1_{4-q}MOR^3_{q-1}X^3$). If all alkoxy groups are replaced due to the reaction with the halogen or halogen compound, then the starting material $R^1_{4-q}MOR^3_q$ becomes $R^1_{4-q}MX^3_q$. Then, as mentioned for Method B above, either starting material $R^1_{4-q}MOR^3_{q-1}X^3$ or $R^1_{4-q}MX^3_q$ is reacted with a compound $R^2X^1$ where $R^2$ is a preferably fluorinated alkyl, aryl, alkenyl or alkynyl group and $X^1$ is preferably an element from group I of the periodic table, so as to form $R^1_{4-q}R^2MOR^3_{q-1}$, $R^1_{4-q}R^2MX^3_{q-1}$ (or even $R^1_{4-q}R^2_2MX^3_{q-2}$ depending upon reaction conditions). A reaction with $R^1_{4-q}MOR^3_{q-1}X^3$ is preferred due to greater ease of control of the reaction.

This Method C can be described as a method comprising reacting a compound of the general formula $X3MOR3_3$, where X3 is a halogen, M is an element selected from group 14 of the periodic table, and OR3 is alkoxy; with a compound of the general formula R1M1; where R1 is selected from alkyl, alkenyl, aryl and alkynyl and wherein R1 is partially or fully fluorinated; and M1 is an element from group I of the periodic table; so as to form a compound of the general formula $R1MOR3_3$.

Related Methods B and C can be described as a single method comprising reacting a compound of the general formula $R1_{4-m}MOR3_{m-n}X_n$ wherein m is an integer from 2 to 4, and n is an integer from 0 to 2, R1 is selected from alkyl, alkenyl, aryl, or alkyl, alkenyl or aryl, and wherein R1 is nonfluorinated, or fully or partially fluorinated; OR3 is alkoxy, and M is an element selected from group 14 of the periodic table; with a compound of the general formula R2M1, wherein R2 is selected from alkyl, alkenyl, aryl, alkynyl, and wherein R2 is at least partially fluorinated, and $M_1$ is an element from group I of the periodic table; so as to make a compound of the general formula $R2MR1_{4-m}OR3_{m-n}X_{n-1}$.

Of course, as will be seen below, the above starting materials in the method examples set forth above are only examples, as many other starting materials could be used. For example, the starting material could be a halide rather than an alkoxide (e.g. a mono-, di- or trichlorosilanes) or another material having both alkoxy and halogen groups on the group 14 element, along with 0, 1 or even 2 organic groups (alkyl, alkenyl, aryl, alkynyl) also bound to the group 14 element. Though the methods for making the materials of the invention preferably use starting materials having the group 14 element set forth above, many different combinations of alkoxy groups, halogen groups, and organic groups (alkyl, alkenyl, . . . etc.) can be bound to the group 14 element. And, of course, such starting materials can be commercially available starting materials or can be made from other available starting materials (in which case such materials are intermediate compounds in the methods for making the materials of the invention).

In addition, the methods for making the materials of the invention include, a method for forming a final compound could include Methods A, B and/or C above. For example, one organic group, preferably fluorinated, could become bound to the group 14 element M by Method A followed by binding a second organic group, preferably fluorinated, to the group 14 element M by Method B. Or, Method B could be performed first, followed by Method A—or Method C could be performed in combination with Methods A and/or B, etc. And, of course, any particular reaction (binding of an organic group to M) could be performed only once by a particular reaction, or multiple times (binding of multiple organic groups, the same or different from each other) by repeating the same reaction (a, b or c) multiple times. Many combinations of these various reactions and starting materials are possible. Furthermore, any of the methods or method combinations could include any of a number of additional steps including preparation of the starting material, replacing one or more alkoxy groups of the final compound with halogens, purifying the final compound, hydrolysis and condensation of the final compound (as will be described further below), etc.

EXAMPLE 1

Making a Compound I via Method B

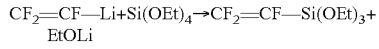

200 ml of freshly distilled dry $Et_2O$ is added to a 500 ml vessel (under an argon atmosphere). The vessel is cooled down to −80° C. and 15 g (0.129 mol) of $CF_2=CFCl$ gas is bubbled to $Et_2O$. 100 ml (0.13 mol) of sec-BuLi is added dropwise during three hours. The temperature of the solution is kept below −60° C. all the time. The solution is stirred for 15 minutes and 29 ml (27.08 g, 0.130 mol) of $Si(OEt)_4$ is added in small portions. The solution is stirred for over night allowing it to warm up to room temperature. Formed red solution is filtered and evaporated to dryness to result crude trifluorovinyltriethoxysilane, $CF_2=CFSi(OEt)_3$.

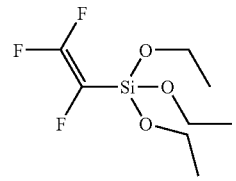

EXAMPLE 2

Making a Compound I via Method C

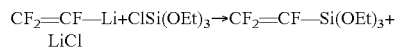

$CF_2=CFSi(OEt)_3$ is also formed when 30.80 g (0.155 mol) $ClSi(OEt)_3$ in $Et_2O$ is slowly added to solution of $CF_2=CF-Li$ (0.155 mol, 13.633 g, prepared in situ) in $Et_2O$ at −78° C. Reaction mixture is stirred overnight allowing it slowly warm to room temperature. LiCl is removed by filtration and solution evaporated to dryness to result yellow liquid, crude trifluorovinyltriethoxysilane.

EXAMPLE 3

Making a Compound IV via Method B or C

Follow steps in Example 1 or 2 above, followed by

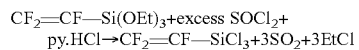

24.4 g (0.100 mol) crude trifluorovinyltriethoxysilane, 44 mL (0.60 mol, 71.4 g) thionylchloride and 1.1 g (0.0045 mol) pyridinium hydrochloride are refluxed and stirred for 24 h. Excess of $SOCl_2$ is evaporated and trifluorovinyltrichlorosilane

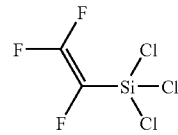

is purified by distillation.

EXAMPLE 4

Making a Compound I via Method A

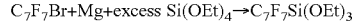

250 g (0.8418 mol) heptafluorobromotoluene, 22.69 g (0.933 mol) magnesium powder, small amount of iodine (15 crystals) and 750 mL (3.3672 mol, 701.49 g) tetraethoxysilane are mixed together at room temperature and diethylether is added dropwise to the vigorously stirred solution until an exothermic reaction is observed (~250 mL). After stirring at room temperature for 16 h dietbylether is evaporated. An excess of n-heptane (~600 mL) is added to precipitate the magnesium salts. Solution is filtrated and evaporated to dryness. The residue is fractionally distilled under reduced pressure to yield heptafluorotoluene-triethoxysilane.

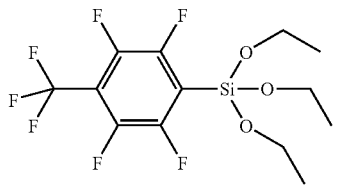

EXAMPLE 5

Making a Compound IV via Method A

Follow the steps in Example 4, followed by

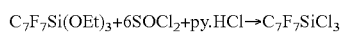

$C_7F_7Si(OEt)_3 + 6SOCl_2 + py·HCl \rightarrow C_7F_7SiCl_3$  2.

where 114.1 g (0.300 mol) heptafluorotoluenetriethoxysilane, 131 mL (1.800 mol, 214.1 g) thionylchloride and 4.51 g (0.039 mol) pyridinium hydrochloride are refluxed and stirred for 16 h. Excess of $SOCl_2$ is evaporated and perfluorotoluenetrichlorosilane

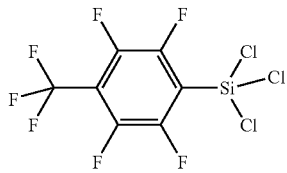

isolated by vacuum-distillation.

EXAMPLE 6

Making a Compound III via Method A

Follow same steps as in Example 5, except isolate (by vacuum distillation at the end), perfluorotoluenedichloroethoxysilane, $CF_3—C_6F_4—Si(OEt)Cl_2$

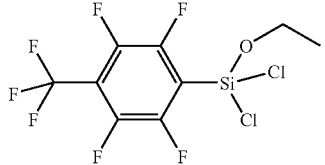

EXAMPLE 7

Making a Compound V from a Compound I or II via Method C

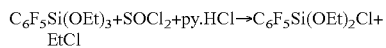

$C_6F_5Si(OEt)_3 + SOCl_2 + py·HCl \rightarrow C_6F_5Si(OEt)_2Cl + EtCl$  1.

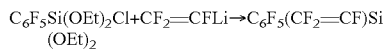

$C_6F_5Si(OEt)_2Cl + CF_2=CFLi \rightarrow C_6F_5(CF_2=CF)Si(OEt)_2$  2.

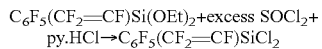

$C_6F_5(CF_2=CF)Si(OEt)_2 + \text{excess } SOCl_2 + py·HCl \rightarrow C_6F_5(CF_2=CF)SiCl_2$  3.

152.0 g (0.460 mol) pentafluorophenyltriethoxysilane, 34 mL (0.460 mol, 54.724 g) thionylchloride and 6.910 g (0.0598 mol) pyridinium hydrochloride are refluxed and stirred for 18 h. Pyridinium hydrochloride is precipitated at −78° C. and the solution is filtrated. Pentafluorophenylchlorodiethoxysilane

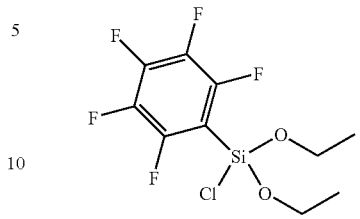

is isolated by vacuum distillation.

Then 49.712 g (0.155 mol) pentafluorophenylchlorodiethoxysilane, $C_6F_5SiCl(OEt)_2$, in $Et_2O$ is slowly added to solution of $CF_2=CF—Li$ (0.155 mol, 13.633 g, prepared in situ) in $Et_2O$ at −78° C. Reaction mixture is stirred overnight while it will slowly warm to room temperature. LiCl is removed by filtration and the product, pentafluorophenyltrifluorovinyldiethoxysilane,

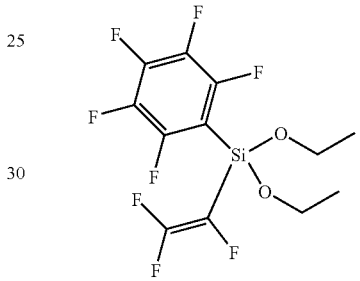

purified by distillation.

EXAMPLE 8

Making a Compound VII from a Compound I or II via Method C

Follow the steps above for Example 7, and then 12.1 g (0.0328 mol) pentafluorophenyltrifluorovinyldiethoxysilane, 12 mL (0.1638 mol, 19.487 g) thionylchloride and 0.50 g (0.0043 mol) pyridinium hydrochloride are refluxed and stirred for 24 h. Excess of $SOCl_2$ is evaporated and residue is fractionally distilled under reduced pressure to yield a mixture of 80% pentafluorophenyltrifluorovinyldichlorosilane.

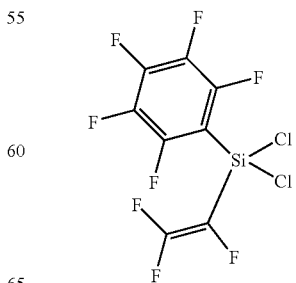

EXAMPLE 9

Making a Compound I via Method A

61.5 mL (0.4944 mol, 122.095 g) pentafluorobromobenzene, 13.22 g (0.5438 mol) magnesium powder and 250.00 g (0.9888 mol) tetraethoxygermane are mixed together at room temperature and diethylether is added dropwise to the vigorously stirred solution until an exothermic reaction is observed (~400 mL). After stirring at 35° C. for 16 h the mixture is cooled to room temperature and diethylether evaporated. An excess of n-heptane (~400 mL) is added to precipitate the magnesium salts. Solution is filtrated and evaporated to dryness. The residue is fractionally distilled under reduced pressure to yield pentafluorophenyl-triethoxygermane.

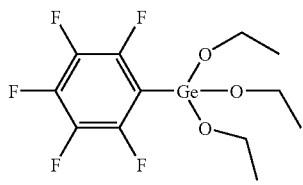

EXAMPLE 10

Making a Compound IV via Method A

Follow the steps in Example 9, then:

50 g (0.133 mol) pentafluorophenyltriethoxygermane, 58 mL (0.80 mol, 95.2 g) thionylchloride and 1.97 g (0.017 mol) pyridinium hydrochloride are refluxed and stirred for 24 h. Excess of SOCl$_2$ is evaporated and pentafluorophenyltrichlorogermane isolated by vacuum distillation.

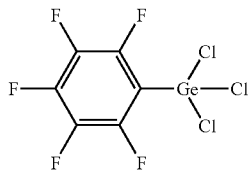

EXAMPLE 11

Making a Compound I via Method A

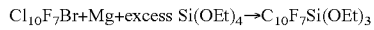

166.5 g (0.50 mol) 2-bromoperfluoronaphthalene, 13.37 g (0.55 mol) magnesium powder and 448.0 mL (2.00 mol, 416.659 g) tetraethoxysilane are mixed together at room temperature and diethylether is added dropwise to the vigorously stirred solution until an exothermic reaction is observed (~200 mL). After stirring at 35° C. for 16 h the mixture is cooled to room temperature and diethylether evaporated. An excess of n-heptane (~400 mL) is added to precipitate the magnesium salts. Solution is filtrated and evaporated to dryness. The residue is fractionally distilled under reduced pressure to yield perfluoronaphthalenetriethoxysilane.

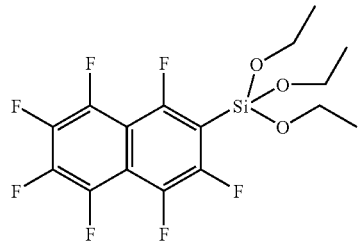

EXAMPLE 12

Making a Compound IV via Method A

Follow the steps in Example 11, then 100 g (0.240 mol) perfluoronaphthalenetriethoxysilane, 105.2 mL (1.442 mol, 171.55 g) thionylchloride and 3.54 g (0.0306 mol) pyridinium hydrochloride are refluxed and stirred for 24 h. Excess of SOCl$_2$ is evaporated and perfluoronaphthalenetrichlorosilane isolated by vacuum distillation.

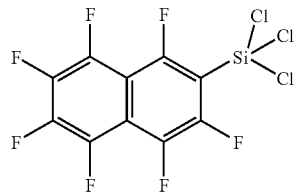

EXAMPLE 13

Making Compound V via Method A

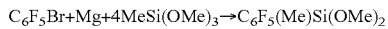

57.9 mL (0.465 mol, 114.726 g) bromopentafluorobenzene, 12.42 g (0.511 mol) magnesium powder and 265 mL (1.858 mol, 253.128 g) methyltrimethoxysilane are mixed together at room temperature and diethylether is added dropwise to the vigorously stirred solution until an exothermic reaction is observed (~320 mL). After stirring at 45° C. for 16 h the mixture is cooled to room temperature and diethylether evaporated. An excess of n-heptane (~300 mL) is added to precipitate the magnesium salts. Solution is filtrated and evaporated to dryness. The residue, methyl(pentafluorophenyl)dimethoxysilane, is used without further purification.

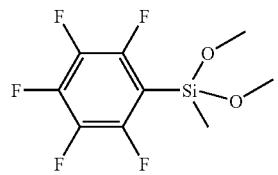

EXAMPLE 14

Making Compound VII via Method A

Follow steps in Example 13, then 81.68 g (0.300 mol) methyl(pentafluorophenyl)dimethoxysilane, 109 mL (1.50 mol, 178.4 g) thionylchloride and 3.69 g (0.0319 mol) pyridinium hydrochloride are refluxed and stirred for 16 h. Excess of SOCl$_2$ is evaporated and methyl (pentafluorophenyl)dichlorosilane isolated by vacuum-distillation.

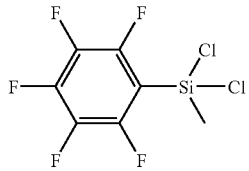

EXAMPLE 15

Making a Compound V via Method A

2C$_6$F$_5$Br+2Mg+Si(OEt)$_4$→(C$_6$F$_5$)$_2$Si(OEt)$_2$ 265.2 mL (1.95 mol, 525.353 g) bromopentafluorobenzene, 52.11 g (2.144 mol) magnesium powder and 216 mL (0.975 mol, 203.025 g) tetraethoxysilane are mixed together at room temperature and diethylether is added dropwise to the vigorously stirred solution until an exothermic reaction is observed (~240 mL). The solution is stirred for 30 minutes after which additional 90 mL of Et$_2$O is carefully added. After stirring at 35° C. for 16 h the mixture is cooled to room temperature and diethylether evaporated. An excess of n-heptane (~600 mL) is added to precipitate the magnesium salts. Solution is filtered and evaporated to dryness. The residue is fractionally distilled under reduced pressure to yield di(pentafluorophenyl)diethoxysilane.

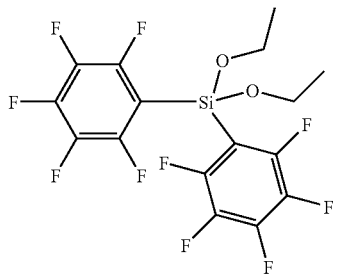

EXAMPLE 16

Making a Compound V via Method C

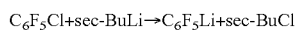

C$_6$F$_5$Cl+sec-BuLi→C$_6$F$_5$Li+sec-BuCl

C$_6$F$_5$Li+C$_6$F$_5$Si(OEt)$_2$Cl→(C$_6$F$_5$)$_2$Si(OEt)$_2$+LiCl 39.52 g (0.195 mol) chloropentafluorobenzene is weighed to a 1000 mL vessel and 250 mL Et$_2$O is added. The vessel is cooled down to −70° C. and 150 mL (0.195 mol) of sec-BuLi (1.3 M) is added dropwise during one hour. The temperature of the solution is kept below −50° C. all the time. The solution is stirred for 30 minutes and 62.54 g (0.195 mol) of diethoxychloropentafluorophenylsilane in Et$_2$O (100 mL) is added in small portions. The solution is stirred for over night allowing it to warm up to room temperature. Formed clear solution is filtered and evaporated to dryness to result di(pentafluorophenyl)diethoxysilane, (C$_6$F$_5$)$_2$Si(OEt)$_2$.

EXAMPLE 17

Making a Compound VII via Method A or C

Follow the steps in Example 15 or Example 16, then:

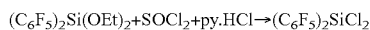

(C$_6$F$_5$)$_2$Si(OEt)$_2$+SOCl$_2$+py.HCl→(C$_6$F$_5$)$_2$SiCl$_2$ 180.93 g (0.400 mol) di(pentafluorophenyl)diethoxysilane, 146 mL (2.00 mol, 237.9 g) thionylchloride and 4.92 g (0.0426 mol) pyridinium hydrochloride are refluxed and stirred for 16 h. Excess of SOCl$_2$ is evaporated and di(pentafluorophenyl)dichlorosilane isolated by vacuum-distillation.

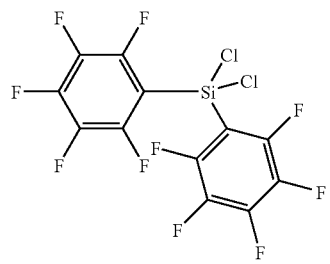

EXAMPLE 18

Making an "Other Compound" via Method A

C$_6$F$_5$MgBr+HSiCl$_3$→C$_6$F$_5$(H)SiCl$_2$ 600.0 mL (0.300 mol) pentafluorophenyl magnesiumbromide (0.5 M sol. in Et$_2$O) is added dropwise to a solution of 30.3 mL (0.300 mol, 40.635 g) HSiCl$_3$ in Et$_2$O at −70° C. Reaction mixture is allowed to warm slowly to room temperature by stirring overnight. Diethylether is evaporated and an excess of n-heptane (~200 mL) is added to precipitate the magnesium salts. Solution is filtrated and evaporated to dryness. The residue, pentafluorophenyldichlorosilane, is purified by fractional distillation.

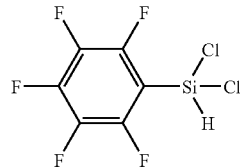

EXAMPLE 19

Making a Compound I via Method C

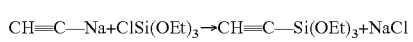

CH≡C—Na+ClSi(OEt)$_3$→CH≡C—Si(OEt)$_3$+NaCl 79.49 g (0.400 mol) ClSi(OEt)$_3$ in Et$_2$O is slowly added to a slurry of CH≡C—Na (0.400 mol, 19.208 g) in Xylene/light mineral oil at −78° C. Reaction mixture is stirred overnight allowing it slowly warm to room temperature. NaCl is removed by filtration and solution evaporated to dryness to result acetylenetriethoxysilane.

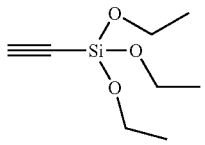

EXAMPLE 20

Making a Compound VII via Method A

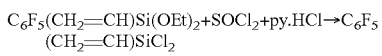

100 mL (0.8021 mol, 198.088 g) pentafluorobromobenzene, 24.90 g (1.024 mol) magnesium powder and 670 mL (3.2084 mol, 610.623 g) vinyltriethoxysilane are mixed together at room temperature and Et$_2$O is added dropwise to the vigorously stirred solution until an exothermic reaction is observed (~400 mL). After stirring at 35° C. for 16 h the mixture is cooled to room temperature and diethylether evaporated. An excess of n-heptane (~500 mL) is added to precipitate the magnesium salts. Solution is filtrated and evaporated to dryness. The residue is fractionally distilled under reduced pressure to yield pentafluorophenylvinyldiethoxysilane.

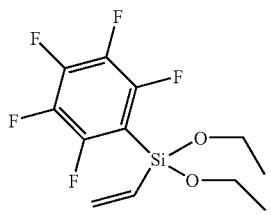

120.275 g (0.3914 mol) pentafluorophenylvinyldiethoxysilane, 143 mL (1.9571 mol, 232.833 g) thionylchloride and 5.880 g (0.0509 mol) pyridinium hydrochloride are refluxed and stirred for 24 h. Excess of SOCl$_2$ is evaporated and pentafluorophenylvinyldichlorosilane

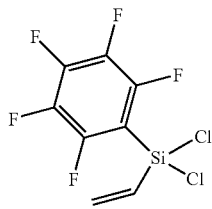

isolated by vacuum distillation.

EXAMPLE 21

Making a Compound I from Method B

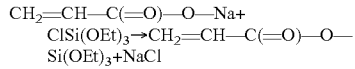

6.123 g (0.0651 mol) sodium acrylate is dissolved to 25 mL THF and cooled to −70° C. 12.8 mL (0.0651 mol, 12.938 g) chlorotriethoxysilane in THF (15 mL) is added dropwise to reaction solution. The solution is stirred for over night allowing it to warm up to room temperature. NaCl is removed by filtration and solution evaporated to dryness to result clear liquid, acryltriethoxysilane.

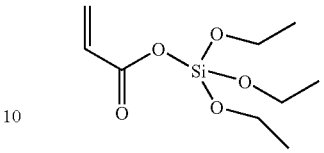

EXAMPLE 22

Making a Compound II

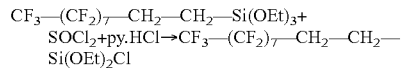

183.11 g (0.300 mol) 1H,1H,2H,2H-Perfluorodecyltriethoxysilane, 22 mL (0.300 mol, 35.69 g) thionylchloride and 4.51 g (0.039 mol) pyridinium hydrochloride are refluxed and stirred for 16 h. Excess of SOCl$_2$ is evaporated and 1H,1H, 2H,2H-Perfluorodecylchlorodi(ethoxy)silane isolated by vacuum-distillation.

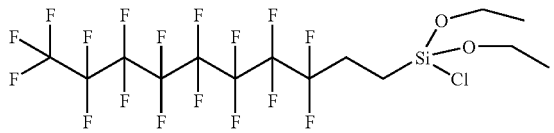

Though this example is not using Methods A, B or C, method C could be used to add a second organic group (replacing the Cl group), or Methods A and B could be used replace an ethoxy group in the starting material with an additional organic group. Also, the starting material could be made by Methods A, B or C (starting earlier with a tetraethoxysilane and reacting as in the other examples herein).

EXAMPLE 23

Making a Compound I via Method A

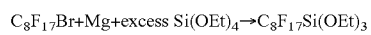

250 g (0.501 mol) 1-Bromoperfluorooctane (or 273.5 g, 0.501 mol 1-Iodoperfluorooctane), 13.39 g (0.551 mol) magnesium powder, small amount of iodine (15 crystals) and 363 mL (2.004 mol, 339.00 g) tetraethoxysilane are mixed together at room temperature and diethylether is added dropwise to the vigorously stirred solution until an exothermic reaction is observed (~200 mL). After stirring at room temperature for 16 h diethylether is evaporated. An excess of n-heptane (~400 mL) is added to precipitate the magnesium salts. Solution is filtrated and evaporated to dryness. The residue is fractionally distilled under reduced pressure to yield perfluorooctyltriethoxysilane.

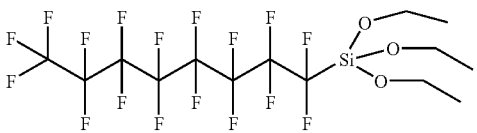

EXAMPLE 24

Making a Compound IV via Method A

Follow the steps in Example 23, then 174.7 g (0.300 mol) perfluorooctyltriethoxysilane, 131 mL (1.800 mol, 214.1 g) thionylchloride and 4.51 g (0.039 mol) pyridinium hydrochloride are refluxed and stirred for 16 h. Excess of $SOCl_2$ is evaporated and perfluorooctyltrichlorosilane isolated by vacuum-distillation.

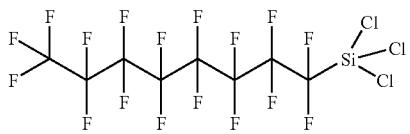

EXAMPLE 25

Making a Compound I via Method A

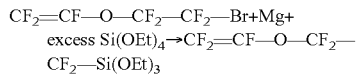

138.47 g (0.500 mol) 2-Bromotetrafluoroethyl trifluorovinyl ether, 13.37 g (0.550 mol) magnesium powder, small amount of iodine (10 crystals) and 362 mL (2.000 mol, 338.33 g) tetraethoxysilane are mixed together at room temperature and diethylether is added dropwise to the vigorously stirred solution until an exothermic reaction is observed (~200 mL). After stirring at room temperature for 16 h diethylether is evaporated. An excess of n-heptane (~400 mL) is added to precipitate the magnesium salts. Solution is filtrated and evaporated to dryness. The residue is fractionally distilled under reduced pressure to yield tetrafluoroethyl trifluorovinyl ether triethoxysilane.

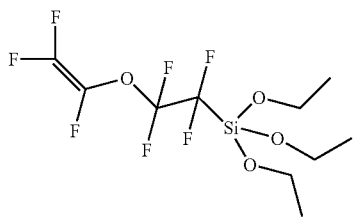

EXAMPLE 26

Making a Compound IV via Method A

Follow steps in Example 25, followed by 108.1 g (0.300 mol) tetrafluoroethyl trifluorovinyl ether triethoxysilane, 131 mL (1.800 mol, 214.1 g) thionylchloride and 4.51 g (0.039 mol) pyridinium hydrochloride are refluxed and stirred for 16 h. Excess of $SOCl_2$ is evaporated and tetrafluoroethyl trifluorovinyl ether trichlorosilane is isolated by vacuum-distillation.

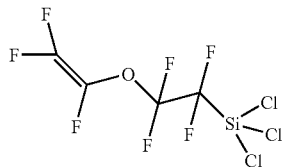

EXAMPLE 27

Making a Compound I via Method B

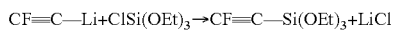

30.80 g (0.155 mol) $ClSi(OEt)_3$ in $Et_2O$ is slowly added to solution of CF≡C—Li (0.155 mol, 7.744 g, prepared in situ) in $Et_2O$ at −78° C. Reaction mixture is stirred overnight allowing it slowly warm to room temperature. LiCl is removed by filtration and solution evaporated to dryness to result fluoroacetylenetriethoxysilane.

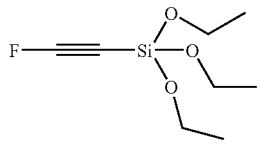

EXAMPLE 28

Making a Compound VIII via Method C

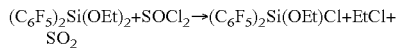

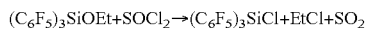

180.93 g (0.400 mol) di(pentafluorophenyl)diethoxysilane, 29 mL (0.400 mol, 47.6 g) thionylchloride and 4.92 g (0.0426 mol) pyridinium hydrochloride are refluxed and stirred for 16 h. Unreacted $SOCl_2$ is evaporated and di(pentafluorophenyl)chloroethoxysilane isolated by vacuum distillation.

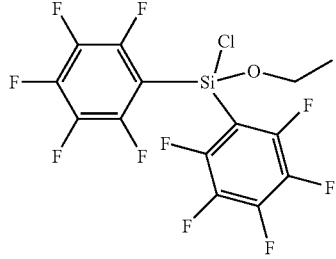

88.54 g (0.200 mol) of di(pentafluorophenyl)chloroethoxysilane in $Et_2O$ is slowly added to solution of $C_6F_5$—Li (0.200 mol, 34.80 g, prepared in situ) in $Et_2O$ at −78° C. The solution is stirred for over night allowing it to warm up to room temperature. Formed clear solution is filtered and evaporated to dryness to result tri(pentafluorophenyl)ethoxysilane, $(C_6F_5)_3SiOEt$.

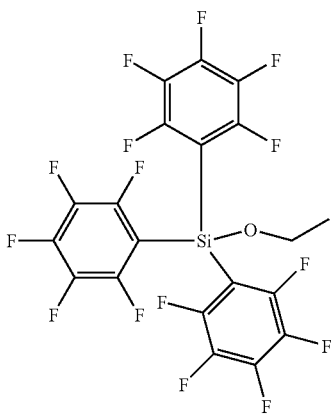

EXAMPLE 29

Making a Compound IX via Method C

Follow steps in Example 28, followed by 114.86 g (0.200 mol) tri(pentafluorophenyl)ethoxysilane, 14.6 mL (0.200 mol, 23.8 g) thionylchloride and 2.46 g (0.0213 mol) pyridinium hydrochloride are refluxed and stirred for 16 h. Unreacted $SOCl_2$ is evaporated and tri(pentafluorophenyl)chlorosilane isolated by vacuum-distillation.

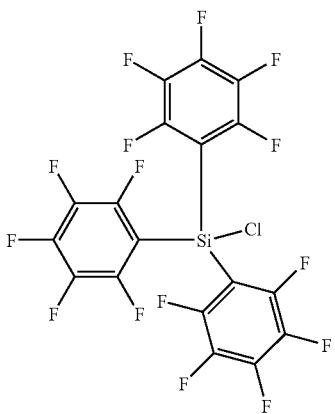

In addition to altering the organic groups in the above examples, it is of course also possible to use other reagents in the methods above. For example, in place of diethyl ether, other solvents such as THF could be used. In place of n-heptane (in Method A) other non polar solvents such as n-hexane could be used. And in place of thionyl chloride (for replacing one or more alkoxy groups with a halogen), chlorine, hydrochloric acid, hydrobromic acid, thionylbromide, chlorine or sulfurylchloride could be used. Also, the temperatures and times (and other process parameters) can be varied as desired. In one example, it is preferred that the molar ratio of the starting material to $R^2X^1$ (Methods B or C) is 0.5:1 to 2:1—preferably 1:1. Also, the starting material and $R^2X^1$ are preferably mixed at a temperature less than –40C degrees, e.g. between –50C and –100C and warmed to a higher temperature over a period of four hours or more (this higher temperature can be room temperature or higher if desired)—or over a longer period of time such as overnight.

As can be seen from the examples above, Methods B and C involve reacting a first compound (having an M group selected from group 14 of the periodic table, 0, 1 or 2 organic groups bound to M) with a second compound (having an element from group 1 of the periodic table and a "new" organic group). As can also be seen from the above, such a reaction can take place if the first compound has alkoxy groups bound to M or both alkoxy and halogen groups (0, 1 or 2 halogen groups) bound to M. Method C, as mentioned earlier, is a variation of Method B—and both methods can be viewed as comprising: reacting a compound of the general formula $R^1_{4-m}MOR^3_{m-n}X_n$, where $R^1$ is any nonfluorinated (including deuterated) or partially or fully fluorinated organic group (preferably a partially or fully fluorinated aryl, alkenyl, alkynyl or alkyl group) as set forth above, where M is selected from group 14 of the periodic table, where X is a halogen, where $OR^3$ is an alkoxy group, where m=2 to 4 and n=0 to 2. $R^1_{4-m}MOR^3_{m-n}X_n$ is reacted with $R^2X^1$ where $R^2$ is selected from alkyl, alkenyl, aryl or alkynyl (and where $R^2$ is fluorinated (fully or partially), and where $X^1$ is an element from group 1 of the periodic table. $X^1$ is preferably Na, Li or K, more preferably Na or Li, and most preferably Li. M is preferably Si, Ge or Sn, more preferably Si or Ge, and most preferably Si. X is preferably Cl, Br or I, more preferably Cl or Br, and most preferably Cl. $OR^3$ is preferably an alkoxy group having from 1 to 4 carbon atoms, more preferably from 1 to 3 carbons, and most preferably 2 carbons (ethoxy). Also, "m" is preferably 3 or 4, whereas "n" is preferably 0 or 1.

$R^1$ and $R^2$ are independently preferably partially or fully fluorinated (though not necessarily as can be seen in prior examples) organic groups such as an aryl group (by aryl group we mean any organic group having a ring structure) though preferably a five or six carbon ring that is unsubstituted or substituted. For a six carbon ring structure, 1, 2 or 3 substituents can be bound to the ring, which substituents can be actively bound to the ring via a variation on the Method C set forth above (to be described further below). The substituents can be alkyl groups of any desired length, straight or branched chain, preferably fluorinated, and preferably having from 1 to 4 carbon atoms. Or the substituents on the ring structure can comprise a C=C double bond and be an alkenyl group (by alkenyl group we mean any organic group with a C=C double bond) such as an acrylate, vinyl or allyl group. A fluorinated vinyl, methyl or ethyl group on a fluorinated phenyl group are examples. Or, the aryl group could be a multi ring structure (e.g. perfluoronaphthalene or a biphenyl group). Or $R^1$ and $R^2$ could independently be an alkenyl group such as a vinyl, or longer chain group having a C=C double bond, or a group having other types of double bonds (e.g C=O double bonds or both C=C and C=O double bonds) such as acrylate and methacrylate groups. $R^1$ and $R^2$ could also be an alkynyl group (by alkynyl group we mean any organic group with a carbon-carbon triple bond) as mentioned previously, as well as an alkyl group. If an alkyl group (by alkyl group we mean a carbon chain of any length), preferably the carbon chain is from 1 to 14, and more preferably from 4 to 8. Perfluorinated alkyl groups from 1 to 8 carbons can be used, as well as fluorinated (e.g. partially fluorinated) groups longer than 8 carbons. All the organic groups above could be deuterated in stead of fluorinated (or partially deuterated and partially fluorinated), though fully or partially fluorinated (particularly fully fluorinated) is preferred.

In Method C set forth above, an organic (or hybrid) group "R" (e.g. R2) becomes bound to a group 3-6 or 13-16 element "M" by replacing a halogen "X" bound to "M" via the specified reaction. In an alternative to this method (Method D), an organic (or hybrid) group "R" (e.g. R1) comprises the halogen "X"—preferably Cl or Br (rather than "X" being bound to "M"). Thus when the reaction is performed, R2 replaces X bound to R1, such that R2 becomes bound to R1 (which is in turn bound to M). Preferably the other groups bound to M are alkoxy groups (OR3) or other organic groups. More particularly, such a method comprises providing a compound $X_aR^1MOR^3{}_2R^4$ where a is from 1 to 3, X is a halogen(s) bound to $R^1$, R1 is an organic group (preferably an aryl, alkyl, alkenyl or alkynyl—more preferably an alkyl or aryl group), $OR^3$ is an alkoxy, and $R^4$ is either an additional alkoxy group or an additional organic group (selected from aryl, alkyl, alkenyl or alkynyl), and reacting this compound with $R^2M^1$ where $M^1$ is selected from group 1 of the periodic table and $R^2$ is an organic group preferably selected from aryl, alkyl, alkenyl and alkynyl, etc., so as to form $R^2{}_aR^1MOR^3{}_2R^4$.

In one example, $R^4$ is an alkoxy group the same as $OR^3$, such that the method comprises reacting $X_aR^1MOR^3{}_3$ with $R^2M^1$ to form $R^2{}_aR^1MOR^3{}_3$ (where $R^1$ and $OR^3$ are bound to M and $R^2$ is bound to $R^1$. In another example, $R^4$ is an organic group selected from aryl, alkyl, alkenyl and alkynyl. Preferably $OR^3$ is a methoxy, ethoxy or propoxy, $R^1$ is an aryl or alkyl (straight or branched chain) having from 1 to 14 carbons, and $R^2$ is an aryl, alkyl, alkenyl or alkynyl, where a=1 or 2 if $R^1$ is an alkyl and a=1, 2 or 3 if $R^1$ is an aryl group. $R^2$ can be an epoxy, acrylate, methacrylate, vinyl, allyl or other group capable of cross linking when exposed to an electron beam or in the presence of a photoinitiator and electromagnetic energy (e.g. UV light).

EXAMPLE A

Forming a Compound I or IV via Method D

1.

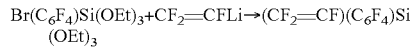

2.

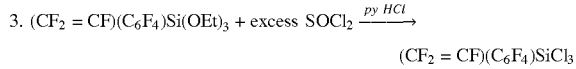

250 g (0.812 mol) 1,4-dibromotetrafluorobenzene, 21.709 g (0.8932 mol) magnesium powder, small amount of iodine (15 crystals) and 181 mL (0.812 mol, 169.164 g) tetraethoxysilane were mixed together at room temperature and diethylether was added dropwise to the vigorously stirred solution until an exothermic reaction was observed (~250 mL). After stirring at room temperature for 16 h diethylether was evaporated. An excess of n-heptane (~600 mL) was added to precipitate the magnesium salts. Solution was filtrated and evaporated to dryness. The residue was fractionally distilled under reduced pressure to yield 4-bromotetrafluorophenyltriethoxysilane.

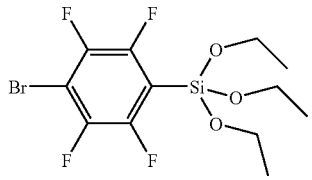

78.246 g (0.200 mol) 4-bromotetrafluorophenyltriethoxysilane in Et₂O is slowly added to solution of CF₂=CF—Li (0.200 mol, 17.592 g, prepared in situ) in Et₂O at −78° C. Reaction mixture is stirred overnight while it will slowly warm to room temperature. LiBr is removed by filtration and the product, 4-triethoxysilyl-perfluorostyrene, purified by distillation.

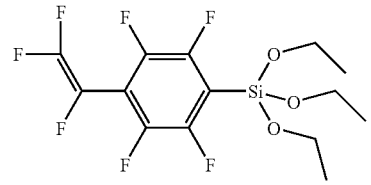

117.704 g (0.300 mol) 4-triethoxysilylperfluorostyrene, 131 mL (1.800 mol, 214.1 g) thionylchloride and 4.51 g (0.039 mol) pyridinium hydrochloride were refluxed and stirred for 16 h. Excess of SOCl₂ was evaporated and 4-trichlorosilyl-perfluorostyrene isolated by vacuum-distillation.

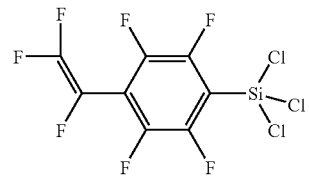

The above example could be modified where 2 or 3 halogens (in this case Br) are bound to the phenyl group so as to result in multiple vinyl substituents. Also, the phenyl group could be another organic group such as an straight or branched chain alkyl group, a multi ring aryl group, etc., whereas the vinyl group could be any suitable organic group capable of binding to a group I element (in the above example Li) and replacing the halogen (in the above example Br). Examples other than vinyl include methyl, ethyl, propyl, phenyl, epoxy and acrylate.

EXAMPLE B

Forming a Compound I via Method D

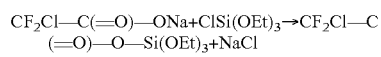

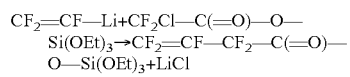

15.246 g (0.10 mol) sodium chlorodifluoroacetate, is dissolved to 100 mL Et₂O and cooled to −70° C. 19.7 mL (0.10 mol, 19.872 g) chlorotriethoxysilane in Et₂O (50 mL) was added dropwise to reaction solution. The solution was stirred for over night allowing it to warm up to room temperature. NaCl is removed by filtration and solution evaporated to dryness to result clear colourless liquid, chlorodifluoroacetic acid, triethoxysilyl ester.

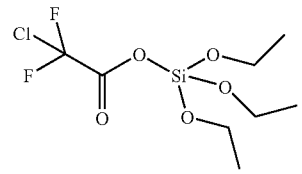

29.27 g (0.10 mol) chlorodifluoroacetic acid, triethoxysilyl ester, is dissolved to 100 mL Et₂O and slowly added to solution of CF₂=CF—Li (0.10 mol, 8.796 g, prepared in situ) in Et₂O at −78° C. Reaction mixture is stirred overnight allowing it slowly warm to room temperature. LiCl is removed by filtration and solution evaporated to dryness to result yellow liquid, crude perfluoro-3-butene acid, triethoxysilyl ester.

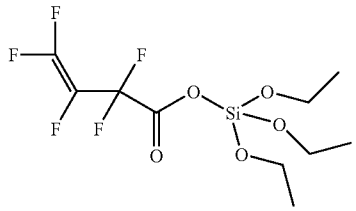

EXAMPLE C

Forming a Compound I or IV via Method D

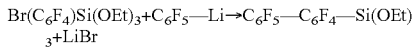

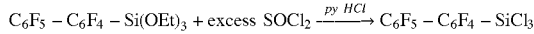

78.246 g (0.200 mol) 4-bromotetrafluorophenyltriethoxysilane in $Et_2O$ is slowly added to solution of $C_6F_5$—Li (0.200 mol, 34.80 g, prepared in situ) in $Et_2O$ at $-78°$ C. Reaction mixture is stirred overnight while it will slowly warm to room temperature. LiBr is removed by filtration and the product, perfluorobiphenyltriethoxysilane, purified by distillation.

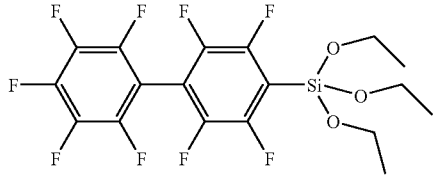

143.516 g (0.300 mol) perfluorobiphenyltriethoxysilane, 131 mL (1.800 mol, 214.1 g) thionylchloride and 4.51 g (0.039 mol) pyridinium hydrochloride were refluxed and stirred for 16 h. Excess of $SOCl_2$ was evaporated and perfluorobiphenyltrichlorosilane isolated by vacuum-distillation.

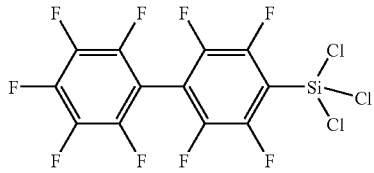

EXAMPLE D

Forming a Compound I or IV via Method D

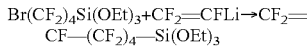

$CF_2 =$

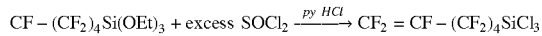

143.94 g (0.40 mol) 1,4-dibromooctafluorobutane, 10.69 g (0.44 mol) magnesium powder, small amount of iodine (15 crystals) and 88 mL (0.40 mol, 82.42 g) tetraethoxysilane were mixed together at room temperature and diethylether was added dropwise to the vigorously stirred solution until an exothermic reaction was observed (~200 mL). After stirring at room temperature for 16 h diethylether was evaporated. An excess of n-heptane (~400 mL) was added to precipitate the magnesium salts. Solution was filtrated and evaporated to dryness. The residue was fractionally distilled under reduced pressure to yield 4-bromooctafluorobutanetriethoxysilane.

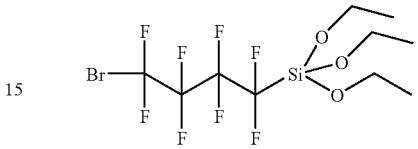

88.641 g (0.200 mol) 4-bromooctafluorobutanetriethoxysilane in $Et_2O$ is slowly added to solution of $CF_2$=CF—Li (0.200 mol, 17.592 g, prepared in situ) in $Et_2O$ at $-78°$ C. Reaction mixture is stirred overnight while it will slowly warm to room temperature. LiBr is removed by filtration and the product, perfluoro-1-hexenetriethoxysilane, purified by distillation.

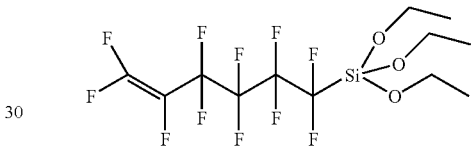

133.295 g (0.300 mol) perfluoro-1-hexenetriethoxysilane, 131 mL (1.800 mol, 214.1 g) thionylchloride and 4.51 g (0.039 mol) pyridinium hydrochloride were refluxed and stirred for 16 h. Excess of $SOCl_2$ was evaporated and perfluoro-1-hexenetrichlorosilane isolated by vacuum-distillation.

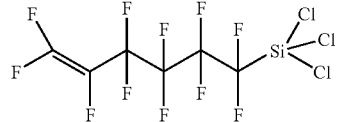

In the above "Method D" examples, $R^1$, $R^2$, $R^3$ and $R^4$ are preferably partially or fully fluorinated.

Hydrolysis and Condensation of the Compound(s):

Compounds IV, VII and IX have organic (or hybrid) R group(s) and halogen(s) (preferably Br or Cl) bound to M (selected from groups 3-6 or 13-16—preferably group 14)). These compounds can be hydrolyzed alone or in any combination to result in a material having a -M-O-M-O- backbone with R groups bound to the backbone, and that preferably has a molecular weight of from 500 to 10,000 (more preferably from 500 to 5000). In one example, a compound selected from Compound IV is hydrolyzed with another compound selected from Compound IV. In another example, a single compound from Compound VII is hydrolyzed. Many other combinations are possible, including: a) Compound IV+Compound VII; b) Compound IV+Compound IV+Compound IV; c) Compound VII+Compound VII; d) Compound IV+Compound VII+Compound IX; e) Compound IV+Compound IV+Compound IX; f) Compound VII+Compound IX, etc. Any other combinations, in any desired ratio, can be used for the hydrolysis and eventual deposition.

The hydrolysis/condensation procedure can comprise five sequential stages: Dissolvement, hydrolysis and co-condensation, neutralization, condensation and stabilization. Not all stages are necessary in all cases. In the hydrolysis, chlorine atoms are replaced with hydroxyl groups in the silane molecule. The following description takes as an example compounds that have chlorine as the halogen that takes part in the hydrolysis reaction, and silicon is the metal in the compound. Hydrochloric acid formed in the hydrolysis is removed in the neutralization stage. Silanols formed in the hydrolysis are attached together for a suitable oligomer in the condensation stage. The oligomer formed in the condensation are stabilized in the end. Each stage can be done with several different ways.

EXAMPLE I

Dissolvement. Chlorosilanes are mixed together in an appropriate reaction container and the mixture is dissolved into a suitable solvent like tetrahydrofuran. Instead of tetrahydrofuran, other solvents can be used (pure or as a mixture): acetone, chloroform, diethyl ether, ethyl acetate, methyl-isobutyl ketone, methyl ethyl ketone, acetonitrile, ethylene glycol dimethyl ether, triethylamine, formic acid, nitromethane, 1,4-dioxan, pyridine, acetic acid.

Hydrolysis. The reaction mixture is cooled to 0° C. The hydrolysis is performed by adding water ($H_2O$) into the reaction mixture. The water is added in 1:4 (volume/volume) water-tetrahydrofuran-solution. Water is used equimolar amount as there are chlorine atoms in the starting reagents. The reaction mixture is held at 0° C. temperature during the addition. The reaction mixture is stirred at room temperature for 1 hour after addition. Instead of tetrahydrofuran, water can be dissolved into pure or mixture of following solvents: acetone, chloroform, diethyl ether, ethyl acetate, methyl-isobutyl ketone, methyl ethyl ketone, acetonitrile, ethylene glycol dimethyl ether, triethylamine, formic acid, nitromethane, 1,4-dioxan, pyridine, acetic acid. In the place of water ($H_2O$) can be used: deuterium oxide ($D_2O$) or HDO. A part of the water can be replaced with alcohols, deuterium alcohols, fluorinated alcohols, chlorinated alcohols, fluorinated deuterated alcohols, and/or chlorinated deuterated alcohols. The reaction mixture may be adjusted to any appropriate temperature. Excess of water can be used. Some level co-condensation can happen during the hydrolysis that can be seen as increment of material molecular mass.

Neutralization. The reaction mixture is neutralized with pure sodium hydrogen carbonate. $NaHCO_3$ is added into cooled reaction mixture at 0° C. temperature ($NaHCO_3$ is added equimolar amount as there is hydrochloric acid in the reaction mixture). The mixture is stirred at the room temperature for a while. After the pH of the reaction mixture has reached value 7, the mixture is filtered. The solvent is then evaporated with rotary evaporator (p=250-50 mbar, t(bath)+30° C.).

Instead of $NaHCO_3$ can be used pure potassium hydrogen carbonate ($KHCO_3$), sodium carbonate ($Na_2CO_3$), potassium carbonate ($K_2CO_3$), sodium hydroxide (NaOH), potassium hydroxide (KOH), calcium hydroxide ($Ca(OH)_2$), magnesium hydroxide ($Mg(OH)_2$) ammonia ($NH_3$), trialkylamines ($R_3N$, where R is hydrogen or straight/branched chain $C_xH_y$, x<10, for example triethanolamine), trialkyl ammonium hydroxides ($R_3NOH$, $R_3N$, where R is hydrogen or straight/branched chain $C_xH_y$, x<10). All neutralization reagents can be added into the reaction mixture also as a solution of any appropriate solvent. Neutralization can be performed also with solvent-solvent-extraction or with azeotropic water evaporation.

Procedure for solvent-solvent-extraction: The solvent is evaporated off after the hydrolysis. The material is dissolved into pure or mixture of solvents such as: chloroform, ethyl acetate, diethyl ether, di-isopropyl ether, dichloromethane, methyl-isobutyl ketone, toluene, carbon disulphide, carbon tetrachloride, benzene, nitromethane, mehylcyclohexane, or chlorobenzene. The solution is extracted several times with water or $D_2O$ until the pH of the organic layer is over value 6. The solvent is then evaporated with rotary evaporator (p=250–50 mbar, t(bath)=+30° C.).

Procedure for azeotropic water evaporation: The solvent is evaporated off after the hydrolysis. The material is dissolved into mixture of water and one of the following solvents (1:10 volume/volume): tetrahydrofuran, ethanol, acetonitrile, 2-propanol, tert-butanol, ethylene glycol dimethyl ether, triethylamine, 2-propanol. The formed solution is evaporated to dryness. The material is dissolved again into the same mixture of water and the solvent. Evaporation and addition cycle is repeated until pH value of the material solution is 7. The solvent is then evaporated with rotary evaporator (p=250–50 mbar, t(bath)=+30° C.).

Neutralization stage in cases where condensation stage is passed: In the neutralization stage evaporation of the solvent in the end is not necessary always. In these cases this stage is aborted after filtering (the reaction mixture is neutral) and the synthesis is continued in stabilization stage (the condensation stage is passed).

Condensation. The material is stirred with magnetic stirrer bar under 12 mbar pressure for few hours. Water, which forms during this final condensation, evaporates off. The pressure in this stage can be in a large range. The material can be heated while vacuum treatment. In some cases this stage is not necessary.

Stabilization. The material is dissolved into cyclohexanone, which is added 30 weight-% of the materials weight. The pH of the solution is adjusted to value 2,0 with acetic acid. In the place of cyclohexanone can be used any of a number of other solvents, (alone or as a mixture), such as methyl-isobutyl ketone, 2-propanol, ethanol, methanol, 1-propanol, tetrahydrofuran, acetone, nitromethane, chlorobenzene, dibutyl ether, mesitylene, 1,1,2,2-tetrachloroethane, trichloroethanes, ethyl lactate, 1,2-propanediol monomethyl ether acetate and/or carbon tetrachloride. In the place of acetic acid can be used regular or deuterated forms of following acids, among others: formic acid, propanoic acid, monofluoro acetic acid, trifluoro acetic acid, trichloro acetic acid, dichloro acetic acid and/or monobromo acetic acid.

Stabilization in cases when the condensation stage is bypassed: Acetic acid is added into the mixture until a pH value of 3-4 is reached. The solution is evaporated until appropriate concentration of the oligomer in the solution has reached (about 50 w-% oligomer, 49 w-% solvent and 1 w-% acid, "solvent" is the solvent of the dissolvement and hydrolysis stages).

In Example I above, "chlorosilanes" are initially mixed together with tetrahydrofuran. As mentioned earlier, this can be an almost unlimited number and type of compounds as disclosed in detail earlier herein—including a large number of chlorosilanes and other halo-metal-organic compounds in accordance with the invention and in accordance with the ultimate properties desired in the final material. If one of the compounds to be hydrolyzed and condensed is pentafluorophenyltrichlorosilane, this can be prepared as in the methods set forth above, by:

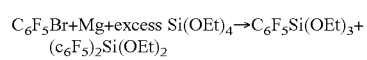

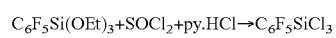

100 mL (0.8021 mol, 198.088 g) pentafluorobromobenzene, 24.90 g (1.024 mol) magnesium powder and 716 mL (3.2084 mol, 668.403 g) tetraethoxysilane are mixed together at room temperature and diethylether is added dropwise to the vigorously stirred solution until an exothermic reaction is observed (~200 mL). After stirring at 35° C. for 16 h the mixture is cooled to room temperature and diethylether evaporated. An excess of n-heptane (~500 mL) is added to precipitate the magnesium salts. Solution is filtrated and evaporated to dryness. The residue is fractionally distilled under reduced pressure to yield pentafluorophenyltriethoxysilane.

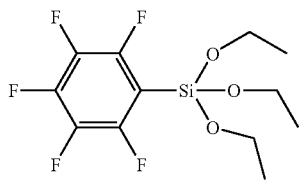

100 mL (0.375 mol, 124.0 g) pentafluorophenyltriethoxysilane, 167 mL (2.29 mol, 272.0 g) thionylchloride and 5.63 g (0.0487 mol) pyridinium hydrochloride are refluxed and stirred for 24 h. Excess of $SOCl_2$ is evaporated and pentafluorophenyltrichlorosilane

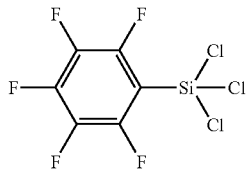

isolated by vacuum-distillation.

If a second of the compounds to be hydrolyzed and condensed is trifluorovinyltrichlorosilane, this can be prepared by:

119 mL (0.155 mol) sec-butyllithium (1.3 M solution in cyclohexane) is added under argon with stirring to 18.053 g (0.155 mol) chlorotrifluoroethylene

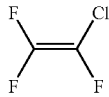

dissolved in $Et_2O$ at −80° C. After the addition is complete the reaction mixture is stirred for 15 min to yield lithiumtrifluoroethylene.

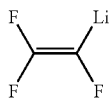

30.80 g (0.155 mol) $ClSi(OEt)_3$ in $Et_2O$ is slowly added to solution of $CF_2=CF-Li$ (0.155 mol, 13.633 g, prepared in situ) in $Et_2O$ at −78° C. Reaction mixture is stirred overnight while it will slowly warm to room temperature. LiCl is removed by filtration and the product, trifluorovinyltriethoxysilane,

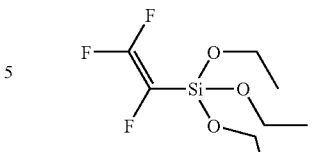

is isolated by distillation.

24.4 g (0.100 mol) trifluorovinyltriethoxysilane, 44 mL (0.60 mol, 71.4 g) thionylchloride and 0.497 g (0.0045 mol) pyridinium hydrochloride are refluxed and stirred for 24 h. Excess of $SOCl_2$ is evaporated and trifluorovinyltrichlorosilane

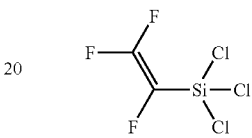

is purified by distillation.

Then, to a solution of trifluorovinyltrichlorosilane and pentafluorophenyltrichlorosilane at a molar ratio 1:1 in dehydrated tetrahydrofuran, is added dropwise a stoichiometric amount of water (e.g. H2O or D2O) in THF at 0° C. (nonstoichiometric amounts, higher or lower, can also be used). After stirring for 1 hour, the solution is neutralized with 3 equivalents of sodium hydrogencarbonate. After confirming the completion of generation of carbonic acid gas from the reaction solution, the solution is filtered and volatile compounds are removed by vacuum evaporation to obtain colorless, transparent viscous liquid. poly(pentafluorophenyltrifluorovinyl-siloxane), in a three dimensional network of alternating silicon and oxygen atoms as illustrated in FIG. 1.

is a halogen; with $H_2O$ or D20; so as to form a compound having a molecular weight of from 500 to 10,000 with a -M-O-M-O- backbone with R1 and R2 substituents on each M. In the hydrolysis example above, silicon atoms of the network are modified by pentafluorophenyl and trifluorovinyl groups in an approximate ratio 1:1. Of course other ratios are possible depending upon the ratio of starting materials, and, of course, other three dimensional networks can be achieved by having other (or additional) starting materials selected from Compound IV, VII and IX, along with other hydrolyzable materials. An alternate example is a method comprising: reacting a compound of the general formula R1R2MX3₂ where R1 is selected from alkyl, alkenyl, aryl and alkynyl, R2 is selected from alkenyl, aryl or alkynyl, M is an element selected from group 14 of the periodic table, and X3 is a halogen; with D20; so as to form a compound having a molecular weight of from 500 to 10,000 with a -M-O-M-O- backbone with R1 and R2 substituents on each M. As mentioned above, Compounds IV, VII and IX have organic (or hybrid) R group(s) and halogen(s) (preferably Br or Cl) bound to M (selected from groups 3-6 or 13-16—preferably group 14)) and can be combined in almost limitless combinations—e.g. a compound selected from the Compound IV group could be hydrolyzed with another compound selected from Compound IV. In another example, a single compound from Compound VII is hydrolyzed. Many other combinations are possible, including: Compound IV+Compound VII; Compound IV+Compound IV+Compound IV; Compound VII+Compound VII; Compound IV+Compound VII+Compound TX; Compound IV+Compound IV+Compound TX; Compound VII+Compound IX, etc.—which various combinations of compounds will result in a hydrolyzed material having at least one organic substituent bound to an inorganic oxide backbone—preferably from 2 to 6 different organic substituents bound to the backbone prior to deposition and exposure. The presence of the organic groups, preferably all fluorinated, allows for improved optical absorption characteristics due to minimal or absent C—H bonds in the deposited material (preferably the hydrolyzed/condensed material has a hydrogen content of 10% or less, preferably 5% or less, and more preferably 1% or less).

Also, though "M" in the above hydrolysis example is silicon, it is possible to have materials with other M groups, or "dope" one or more silanes to be hydrolyzed with a lesser (though not necessarily lesser) amount of a compound having a different M group such as boron, a metalloid and/or an early transition metal (e.g. B, Al, Si, Ge, Sn, Sb, Pb, Ta, Ti, Zr, Er, Yb and/or Nb). As an example, a material could be formed from hydrolyzing/condensing one or more compounds each formed of silicon, chlorine and one or more fluorinated organic compounds bound to the silicon, whereas another material could be formed by hydrolyzing/condensing such compound with one or more additional compounds that each comprise an element other than silicon (Ge, Nb, Yb etc.), chlorine and one or more fluorinated organic groups. In this way, the inorganic backbone of the hydrolyzed/condensed material will comprise silicon, oxygen and the element(s) other than silicon, with fluorinated organic groups bound to this backbone. This "modified backbone" can result in a material refractive index different than one having an inorganic backbone comprising silicon and oxygen alone. Such an ability to modify the refractive index is desirable for forming core and cladding layers in a waveguide.

Deposition of the Hydrolyzed and Condensed Material:

The material formed as above preferably has a molecular weight between 500 and 10,000, more preferably between 500 and 5000. Other molecular weights are possible within the scope of the invention, however a weight between 500 and 5000 provides the best properties for depositing the material on a substrate. The substrate can be any suitable substrate, such as any article of manufacture that could benefit from the combined benefits of a hybrid organic-inorganic material. In the fields of electronics and optical communications, the material could be deposited as a final passivation layer, as a glob top coating, as an underfill in a flip chip process, as a hermetic packaging layer, etc. Because the material can be patterned as will be discussed further below, the material could be deposited on a substrate (e.g. a glass, quartz, silicon or other wafer) as a buffer/cladding, waveguide/core or other layer within a waveguide or other optoelectronic/photonic device. In general, the siloxane oligomer—the hybrid organic-inorganic material having the molecular weight as set forth above—is mixed with a suitable solvent and deposited. The solvent can be any suitable solvent, such as isopropanol, ethanol, methanol, THF, mesitylene, toluene, cyclohexanone, cyclopentanone, dioxane, methyl isobutyl ketone, or perfluorinated toluene.

Deposition is generally at a temperature of 200C or less (can be at 150C or less). If the material is annealed after deposition, it is preferably at 200C or less. If the material is to be patterned by exposure to electromagnetic radiation (e.g. UV light) then a photoinitiator can be mixed into the material along with the solvent. There are many suitable types of photoinitiators that could be used, such as Irgacure 184, Irgacure 500, Irgacure 784, Irgacure 819, Irgacure 1300, Irgacure 1800, Darocure 1173 or Darocure 4265. The initiator could be highly fluorinated, such as 1,4-bis(pentafluorobenzoyl)benzene or Rhodosil 2074 photoinitiator. Also, thermal initiators can be applied for thermal crosslinking of organic carbon double bond moieties, such as with Benzoyl peroxide, 2,2'-Azobisisobutyronitrile, or tert-Butyl hydroperoxide. The amount of these photo or thermal initiators may vary from 0.1 to 5 w-%. They may appear in solid or liquid phase. The initiator is carefully mixed with the material that already contains "processing solvent". (Organic dopants or liquid crystal dopants—or erbium—can be mixed with the material at this point if desired.) Finally the material is filtered through inert semiconductor grade filter to remove all undissolved material.

Spin-on processing. After hydrolysis and condensation, the material solution is deposited on a substrate in a spin-on process (or by dipping, spray and meniscus coating, etc.). Both static and dynamic deposition can be used. The material is first spread over a wafer or other substrate at low speed (50 to 700 rpm) for 5 to 10 seconds and then the speed is increased by 500 to 5000 rpm/s acceleration to 1000 rpm or higher depending upon starting speed. However, slower speeds may be used if very thick films are required. If 1000 rpm spinning speed is applied film thicknesses from 100 nm to 30,000 nm are achieved depending on material viscosity. Material viscosity can be tuned by increasing the amount of process solvent, which typically have relative low vapor pressure and high boiling point. Spinning is continued for 30 to 60 seconds to obtain uniform film over the wafer. After the spinning, an edge bead removal process is accomplished and the wafer is pre-baked (in nitrogen on hot-plate or in furnace) at temperature around 100 Celsius for 1 minute to remove the process solvent (if used) and improve adhesion to the substrate or to the layer underneath of the current material. Similar spin cycles are applicable for all three main optical layers, which are buffer, core and cladding layers. Adhesion promoter such as 1% aminopropyltrimethoxy silane in IPA or plasma activation may be applied between the main optical layers to improve adhesion between them.

The substrate can be any suitable substrate or article. In many cases, the substrate will be a planar wafer-type substrate, such as a glass, plastic, quartz, sapphire, ceramic or a semiconductor substrate (e.g. germanium or silicon). The substrate can have electronic or photonic circuitry thereon. For example, the substrate could be an integrated circuit or a printed circuit board. Or, a light emitter or photodetector could be provided on the substrate prior to deposition of the hybrid material of the invention (or such an additional optical component could be "dropped in" after deposition of the material. The photodetector could be an avalanche photodiode or PIN diode, whereas the light emitter could be a laser (e.g. VCSEL) or LED (e.g. OLED). Or, the light emitter could be a monolithic Fabry-Perot laser, a monolithic Bragg laser, a monolithic distributed feedback laser or a semconductor quantum well laser. The light emitter could also be a single frequency laser (e.g. a distributed feedback laser) or a multi-frequency laser (e.g. an integrated cavity laser or an arrayed laser).

There is essentially no limit to the number or types of photonic or electronic devices that could be integrated with the deposited material—whether the material is used as a simple coating or passivation layer, or as a waveguide (of course, if the material forms the cladding and/or core layers of a waveguide, it is preferable that the other optical component(s) is disposed so as to properly direct or receive light into or out of the waveguide (in a simple example, the waveguide acts as a coupler between a fiber and the photodetector or light emittor). Other optical devices that could be formed on the substrate, or in communication with the waveguide, include N-port splitters with cascading Y couplers, planar crossovers, amplifiers, switches, wavelength division multiplexor receiver assemblies, arrayed waveguide gratings, PIN diode receivers, external modulators, combiners, amplifiers (e g. multistage EDFA), isolators, resonant couplers, wavelength couplers or splitters, waveguide grating routers, filters, integrated EDWAs, monolithic DCMs, reonfigurable OADMs, optical channel monitors, thermo optic VOAs, dispersion compensators, gain flatterners, tunable waveguide gratings, waveguide polarizers, splitters, interleavers, taps, etc. Or, the material of the invention could be used to form the optical device components themselves, if desired.

Deposition Example 1: Add 10 w-% of methyl isobutyl ketone and 1 w-% of Darocure 1173 photoinitiator to result in the formation of a spin-coatable and photo-sensitive material. The material is deposited by spin coating, spray coating, dip coating, etc. onto a substrate or other article of manufacture. As mentioned herein, many other organic groups can be used in place of the above groups, though preferably one of the groups in one of the compounds is capable of cross linking when exposed to electromagnetic energy (or an electron beam)—e.g. an organic group with a ring structure (e.g. an epoxy) or a double bond (e.g. vinyl, allyl, acrylate, etc.). And, preferably such a cross linking group is partially or fully fluorinated so that the organic cross linking groups in the material after cross linking will be fluorinated cross linking groups—ideally perfluorocarbon cross linking groups in the finally formed material.

Figure 2:
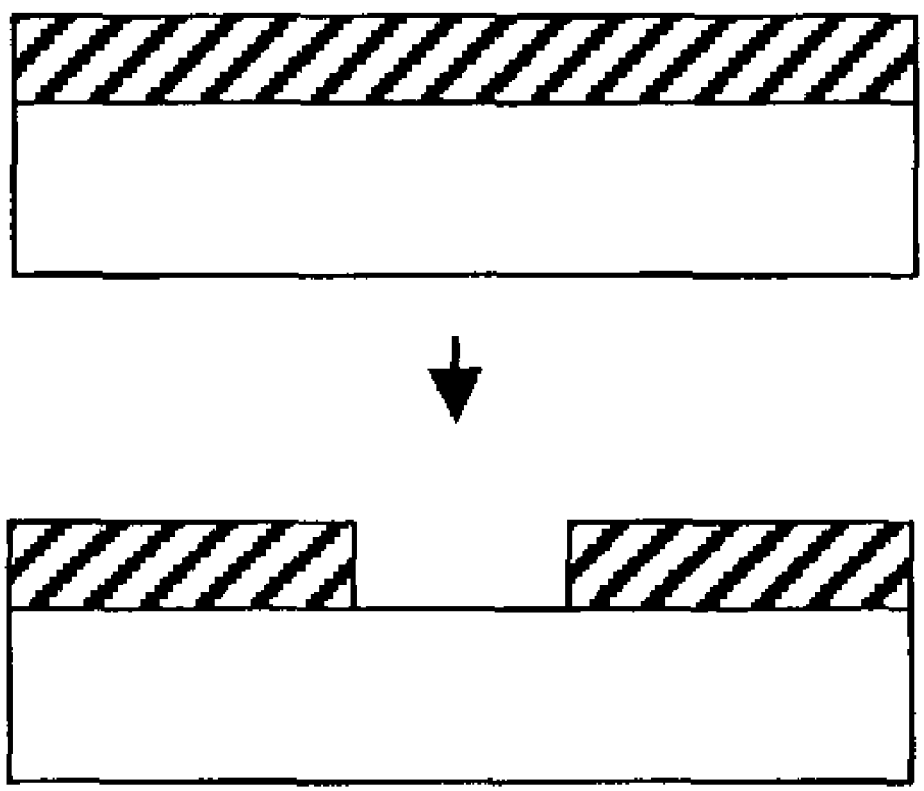
FIG. 2 illustrates the hybrid organic-inorganic material of the present invention deposited on a substrate and a non-exposed area of the hybrid organic-inorganic material removed from the substrate.

Exposure:

One use of the material set forth above is as a layer within a waveguide. However, as mentioned elsewhere herein, many other devices, from simple hybrid coatings to complex optical devices, can be formed from the materials and methods described above. In the most simple form, as can be seen in FIG. 2, the material of the invention is deposited on a substrate (any suitable substrate, including light transmissive substrates, silicon wafers, or any other suitable article), followed by exposure to e.g. UV light (or e beam) and removal of non-exposed areas. Regardless of the article being formed, it will be desirable to cross link the deposited material. As mentioned above, any suitable cross linking agent can be used, including common thermal and photo initiators. Assuming that a photoinitiator has been used, then the deposited core layer material acts as a negative tone photoresist, i.e. exposed regions becomes less soluble in a developer. The deposited material can be exposed with any suitable electromagnetic energy, though preferably having a wavelength from 13 nm to 700 nm, including DUV (210-280 nm), mid-UV (280-310 nm), standard I-line or G-line UV-light. DV exposure is preferred. A stepper can be used for the UV exposure. Typically contact mask exposure techniques are applied. Exposure times may vary between 1 second to several hundred seconds. After the exposure the unexposed areas are removed by soaking the substrate/article (e.g. wafer) or otherwise exposing the substrate/article to a suitable developer (e.g. spray-development may also be used). A developer such as Dow Chemical DS2100, Isopropanol, methyl isobutyl ketone etc. or their combinations can be used to remove unexposed material. Typically 2 minutes development time is used and a solvent rinse (e.g. an ethanol rinse) is preferred to finalize the development. The rinsing removes development residues from the wafer. The adhesion of the exposed structures and the effectiveness of the exposure can be increased by heat-treating the article/substrate (e.g. a slow anneal at elevated temperature—typically less than 200 C). Other exposure techniques, such as exposure with a laser or with Deep UV, could also be performed in place of the above.

Post-baking process. The final hardening of the material is achieved by baking (in air, nitrogen, argon or helium) the article/substrate for several hours typically at less than 200 C. Step-wise heating ramp-up and ramp-down are preferred. The material can also be fully or partially hardened with deep UV light curing.

In the alternative to the above, the material to be patterned is spun on, prebaked, hard baked (typically less than 200 C). Then standard photoresist and RIE etching techniques are applied.

Waveguide:

If the article being formed is a waveguide, the substrate could be a PCB, IC, silicon, glass or quartz wafer, etc., upon which is deposited a lower cladding layer. (A buffer layer can first be deposited if desired.) The cladding layer is made by forming Compounds IV, VII and/or IX and hydrolyzing such compound(s), followed by mixing the hydrolyzed material with a solvent and thermal initiator and then depositing onto the substrate, as set forth in further detail above. After deposition, the cladding layer can be exposed to UV light and/or baked to solidify the cladding. On the cladding layer is deposited a core layer that is made and deposited as above, except with a different ratio of compounds or different compounds that are hydrolyzed/condensed to form the material ready for deposition. By modifying the hydrolysable compounds and/or ratios of compounds in the core layer vs. those in the cladding layer, a different index of refraction is achieved. A developer (e.g. e.g. methanol, ethanol, propanol, acetone, methyl isobutyl ketone, tetrahydrofuran, Dow Chemical DS2100, Dow Chemical DS3000, etc.) is then applied to remove unexposed material. In this way, a core for the waveguide is formed. Then an upper cladding layer is made and deposited in the same way as the lower cladding layer. Though in this example the mask is a binary mask (the material is either fully exposed or not exposed to electromagnetic radiation), it is also possible to provide partial exposure (e.g. in a continuum from full exposure to a low or non-exposure level as in a gray scale mask). Such a gray scale exposure can form a vertical taper in the waveguide when the developer is applied.

Figure 3A:
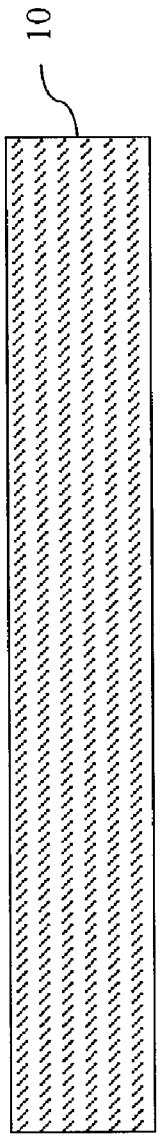
FIGS. 3A to 3F illustrate the steps of a method for forming a waveguide according to the present invention.
Figure 3B:
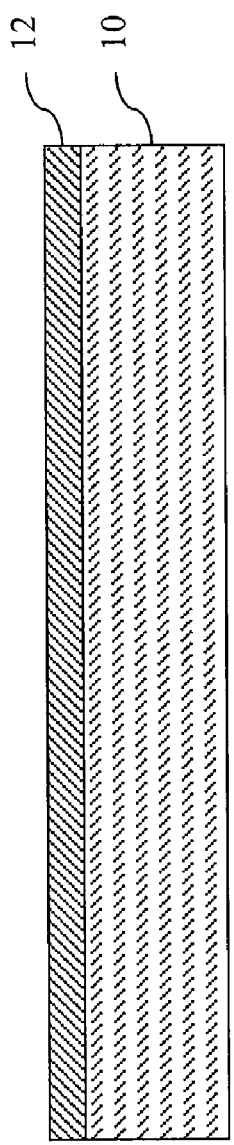
Figure 3C:
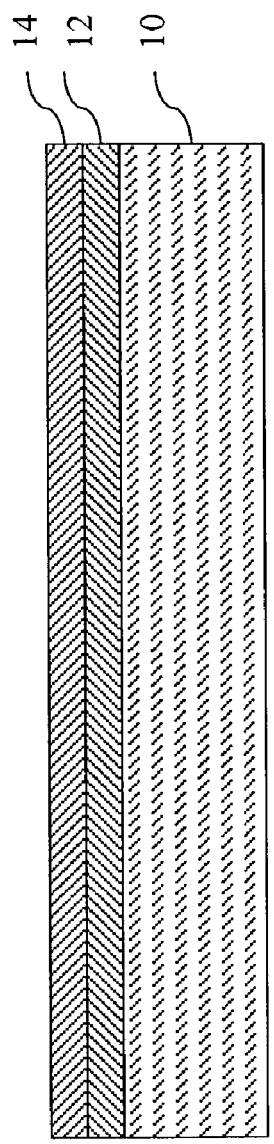
Figure 3D:
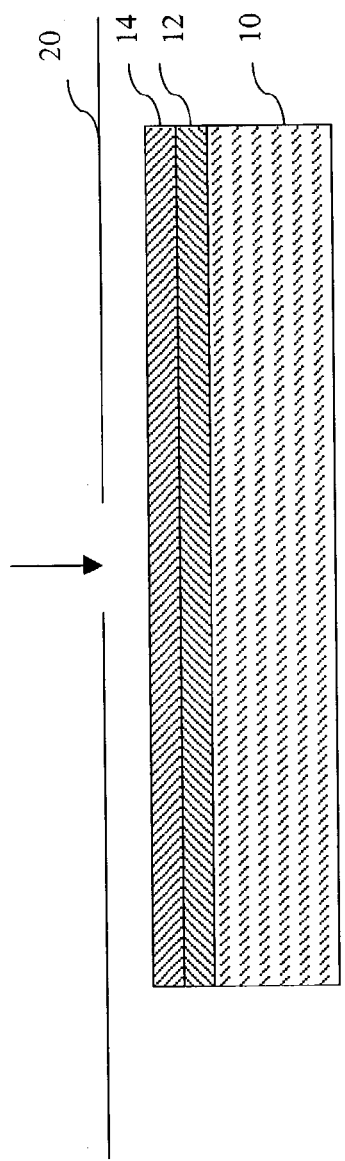
Figure 3E:
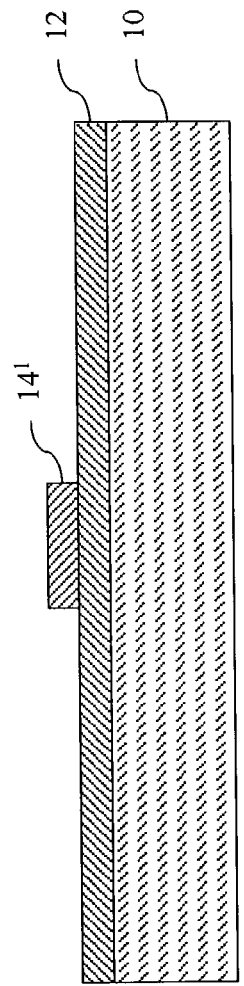
Figure 3F:
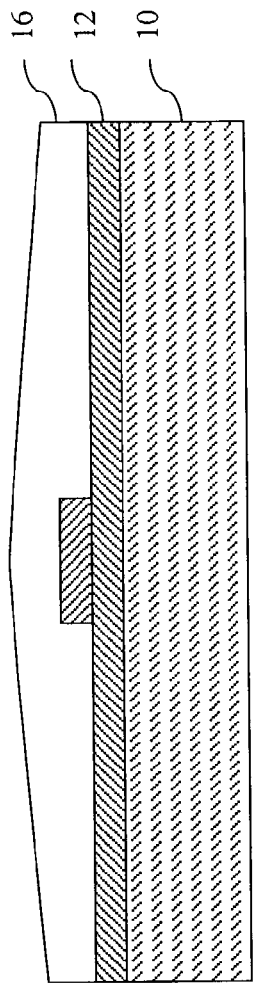
Figure 5:
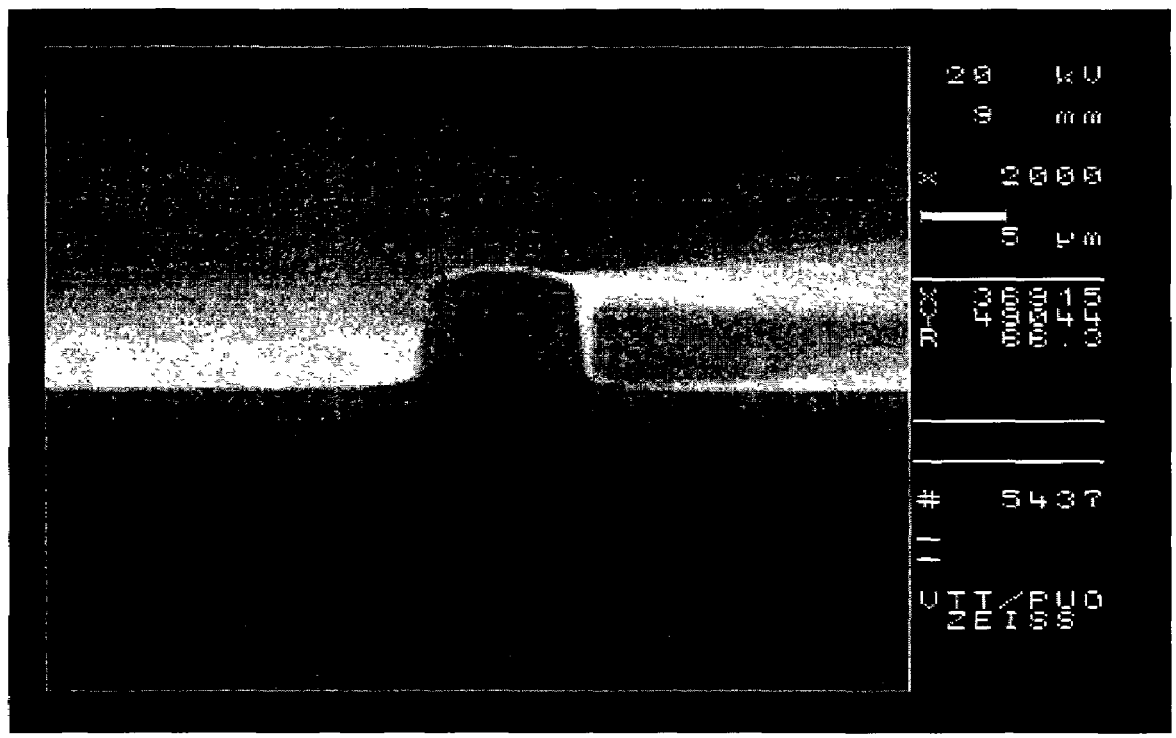
FIG. 5 is a cross section photograph of a patterned core prepared in accordance with the method illustrated in FIGS. 3A to 3F.

More particularly, as can be seen in FIG. 3A, a substrate 10 is provided, on which is deposited a lower cladding layer 12 (FIG. 3B). A buffer layer could be deposited prior to depositing the lower cladding layer, depending in part on the thickness of the lower cladding layer that is deposited. After depositing the lower cladding layer, a core layer 14 is deposited (FIG. 3C). Core layer 14 preferably has a different refractive index than the lower cladding layer. Core layer 14 is then patterned, preferably by exposure to light (preferably UV light) via a mask 20 (FIG. 3D). Areas that are exposed to light undergo cross linking and hardening. As can be seen in FIG. 3E, application of a developer allows for removal of unexposed areas, with exposed areas 141 of the core layer remaining (now the core). Baking/annealing can be used to stabilize the remaining areas of the core layer. As can be seen in FIG. 3F, an upper cladding layer 16 is deposited, followed by a final hard bake. Preferably upper cladding layer 16 has a different refractive index than core 141, which refractive index can be the same as that of the lower cladding layer 12. A cross section photograph of a patterned core, in accordance with the method of FIGS. 3A to 3F, is illustrated in FIG. 5.

Figure 4A:
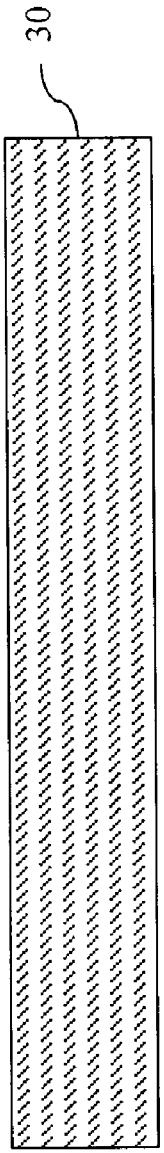
FIGS. 4A to 4H illustrate the steps of an alternate method for forming a waveguide according to the present invention.
Figure 4B:
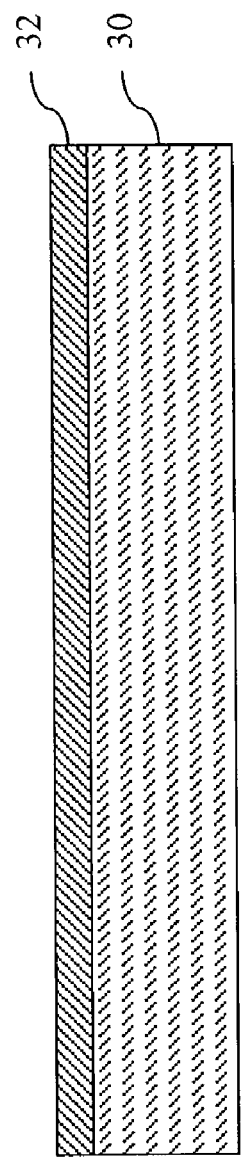
Figure 4C:
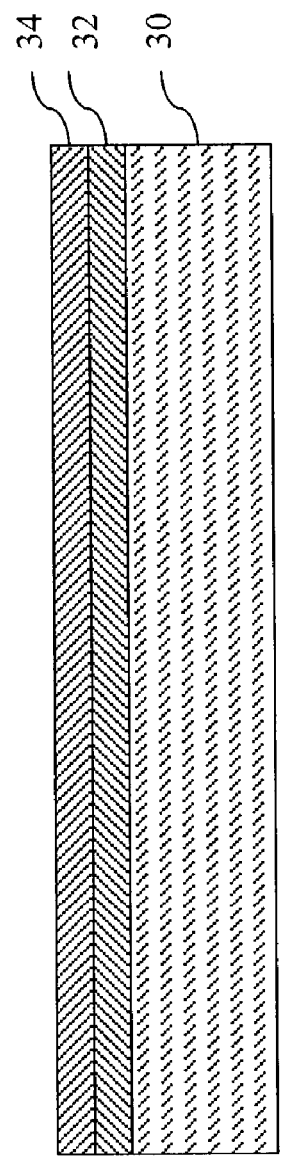
Figure 4D:
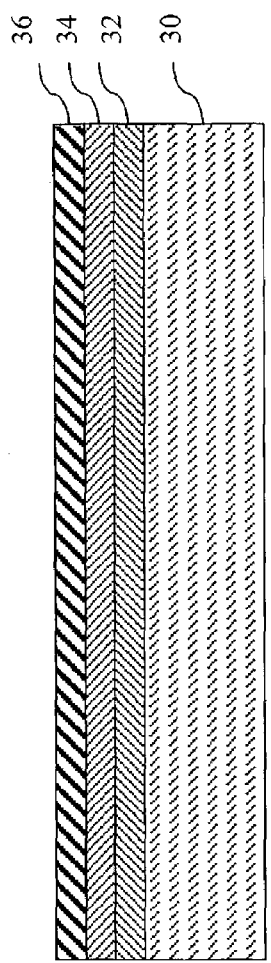
Figure 4E:
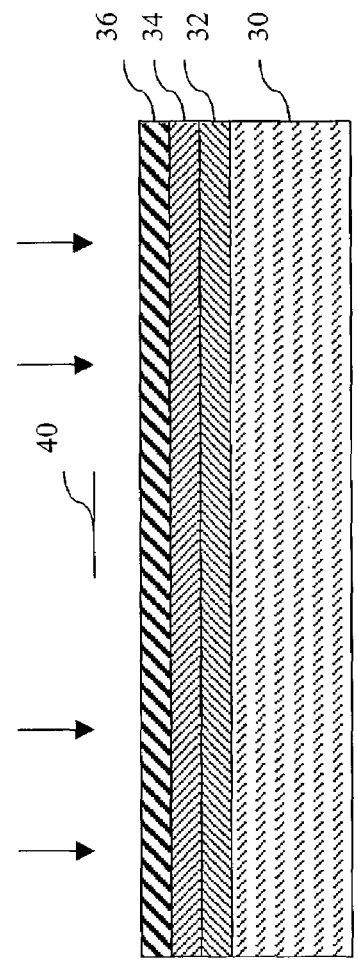
Figure 4F:
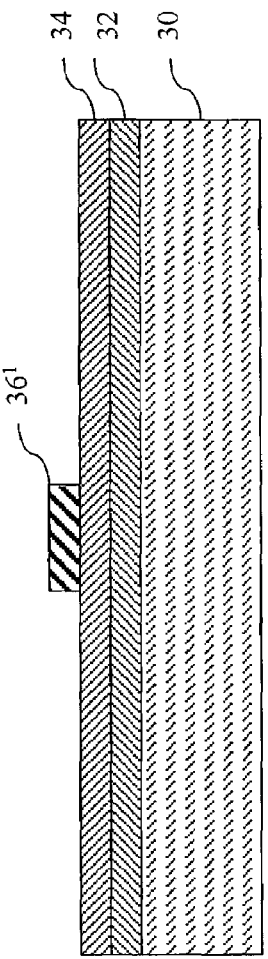
Figure 4G:
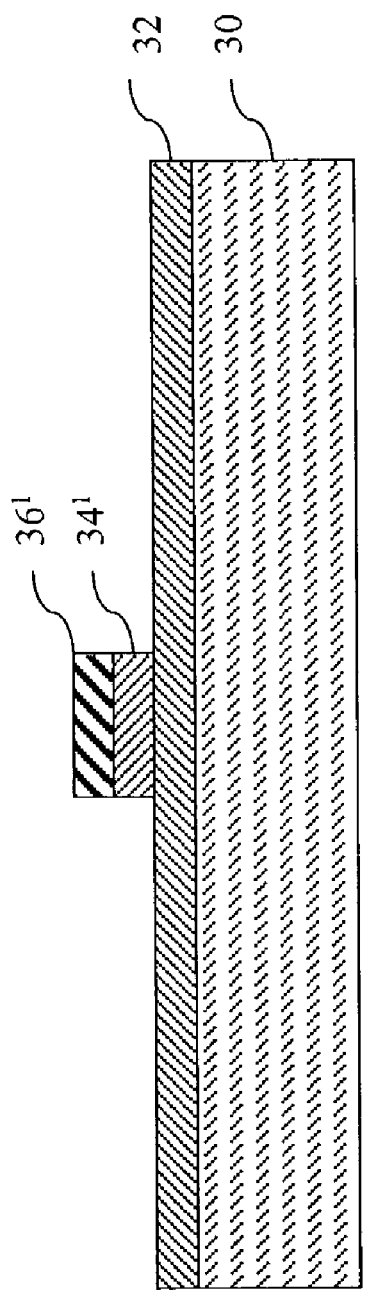
Figure 4H:
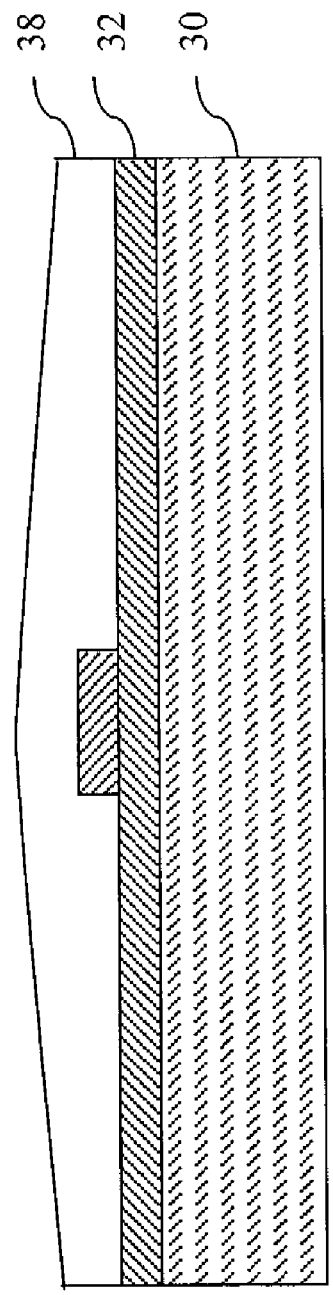

An alternate process for forming a waveguide is illustrated in FIG. 4A, a substrate 30 is provided, upon which is deposited a lower cladding layer 32 (FIG. 4B). As above, a buffer layer could also be provided, prior to depositing the lower cladding layer, if desired. The substrate and any layers thereon can be heated to stabilize the deposited layer(s). As can be seen in FIG. 4C, a core layer 34 is provided preferably having a refractive index different than the refractive index of the lower cladding layer. Then, as can be seen in FIG. 4D, a photoresist layer 36 (e.g. positive tone) is deposited (preferably by spin-on), followed by a pre-bake. Then, the photoresist is exposed to electromagnetic radiation in FIG. 4E (e.g. UV light—wavelength depending upon the type of photoresist selected), and exposed to a developer (FIG. 4F) to remove exposed areas of resist, leaving behind unexposed resist areas 36[1]. Then, core layer 34 is etched, such as by reactive ion etching, so as to remove areas of core layer not protected by resist areas 36[1]—leaving behind core layer portion 34[1]. Finally, resist portions 36[1] are removed, and, as illustrated in FIG. 4H, an upper cladding layer 38 is deposited, followed by heating of the thus formed waveguide. Any of the cladding layers and core layer (as well as buffer layer if included) can be formed of the hybrid material of the invention. Of course, the cladding layers preferably have a different refractive index than the core, which refractive index can be achieved by modifying the inorganic backbone and/or the organic groups bound thereto, as mentioned elsewhere herein.

Material Characteristics:

Material processed and formed on a substrate as above, was tested to determine various characteristics of the deposited and cross linked material. As will be seen below, some tests were performed on the material in "bulk form"—e.g. by testing deposited material on a substrate. Other tests were performed after patterning and forming a waveguide. For example, in testing contact angle, a bulk measurement was made after forming a layer on a substrate. In a test of the hydrophobicity of the hybrid material, a water contact angle measurement can be measured. The phenomenon of wetting or non-wetting of a solid by a liquid can be understood in terms of the contact angle. A drop of a liquid resting on a solid surface forming an angle relative to the surface may be considered as resting in equilibrium by balancing the three forces involved (namely, the interfacial tensions between solid and liquid, that between solid and vapor and that between liquid and vapor). The angle within the liquid phase is known the contact angle or wetting angle. It is the angle included between the tangent plane to the surface of the liquid and the tangent plane to the surface of the solid, at any point along their line of contact. The surface tension of the solid will favor spreading of the liquid, but this is opposed by the solid-liquid interfacial tension and the vector of the surface tension of the liquid in the plane of the solid surface.

In the present invention, contact angles of 90 degrees or more, and generally 100 degrees or more are easily achieved (from 50 ul of ultrapure water). Depending upon the compounds selected for hydrolysis/condensation, water contact angles of 125 degrees or more, or even 150 degrees or more can be achieved. Particularly if all organic groups, including those that provide bulk to the final material (e.g. a longer alkyl chain or a single or multi ring aryl group) as well as those that allow for cross linking (e.g. organic groups with unsaturated double bonds), are fully fluorinated—then the resulting material can be highly hydrophobic and result in very large contact angles. The hydrophobicity can easily be tailored depending upon which compounds are selected, and in what amounts, for hydrolysis/condensation.

The optical loss of the materials were also tested and determined to be less than 0.1 dB/cm at 1550 nm. The optical loss can be less than 0.09 dB/cm (or even less than 0.075 dB/cm or less than 0.05 dB/cm) at 1550 nm, depending upon which compounds and in what amounts are selected for hydrolysis/condensation, and in particular the level of fluorination of the compounds selected. The deposited materials tested also have an optical loss less than 0.1 dB/cm (or even less than 0.075 dB/cm) at 1310 nm, C Band and L Band. The optical bulk loss measurement was carried out from bulk sample of the optical material by using Varian Gary 5 UV-Vis-IR spectrophotometer.

Polarization Dependent Loss (PDL) measurements were made on a formed waveguide. Equipment used for PDL measurements, included a red light source, a laser source, a coupler, a polarization controller, input and output single mode fibres, a detector, alignment stages, a fibre coupler, a lens and a screen: Align input fibre directly to output fibre, moving fibre holders nearer each other as required. Ensure the red light source is switched off and the polarization controller is not scanning. Dispense a bead of index matching fluid between fibres and optimize the alignment using the laser and power meter. Ensure the averaging time of the detector is 20 ms and the wavelength is 1550 nm. Set the polarization controller scanning on scan speed 5. Wait for 10 s and record the maximum and minimum power levels. Stop the polarization controller scanning. Plot the average and the PDL on the chart. Make sure values are within acceptable limits. Then, turn red light source on and laser off. Wipe the facets of the chip gently with IPA and place it on the holder. Looking through the microscope, roughly align the input fibre to the desired waveguide. Place the lens on the output stage, about 7 mm from the output facet. Align the input fibre vertically until a red line is observed on the screen. Focus the line on the screen by moving the lens nearer or further from the chip. Scan the input fibre across the input of the chip until a spot is observed on the screen. Check using the microscope that the fibre is aligned to the correct waveguide still. Then, remove the lens and replace with the output fibre. Using the microscope, position the fibre near the desired waveguide, about 100 um (the width of the fibre) back from the chip. Turn the red light off and the laser on. Move the output fibre vertically until the power is maximized. Move the output fibre horizontally until the power is maximized. Dispense a bead of index fluid on the input and output facets. Finely adjust all axes until the power is optimized. Then, scan the polarization controller and wait for 10 seconds. Record the maximum and minimum power levels, calculating the average loss and the PDL. To measure the next waveguide, retract the input and output fibres slightly and index the center stage to the next waveguide. The power meter will indicate when the next waveguide is in position. Return to the 'chip alignment' stage. Polarization dependent loss was found to be 0.1 dB/cm or less, and generally 0.05 dB/cm or less. In some cases, the PDL was 0.01 dB/cm or less. Birefringence measurements were also performed on the materials.

Birefringence was found to be less than 5×e-5, and in many cases less than 2×10e-5 (or as low as 1×10e-6) depending upon the compounds selected for hydrolysis/condensation. The birefringence of the slab optical films were measured on a SCI FilmTech 4000. Stability of deposited materials of the invention was determined by the so-called "pressure cooking" testing procedure. In this procedure, the material was deposited on a substrate and, after cross linking (thermal and/or light exposed cross linking depending upon the initiator used), tested for optical properties such as optical absorbance, polarization dependent loss and refractive index.

Then, the material was placed into a pressure chamber that contains an amount of water. The chamber was heated up to 120 C and maintained at a pressure of 2 atm, at which point the water formed supercritical water vapor. The material was held in this environment for 2 hours and then removed and tested optically (optical absorbance, polarization dependent loss and refractive index). It was found that the material was still present on the substrate and had not been changed structurally. Also, the optical testing showed that optical absorbance, polarization dependent loss and index of refraction each remained within 5% (in most cases within 1%) of the original values prior to the exposure to the supercritical water. The testing showed a high level of stability not normally found in optical materials having an organic component such as the materials of the present invention.

Other properties of the materials, such as surface and sidewall roughness, feature size, aspect ratio, and glass transition temperature were also measured. The glass transition temperature, Tg, of the deposited materials was measured using a Mettler-Toledo Differential Scanning Calorimeter (DSC) and found to be 200 C or greater, and generally 250 C or greater (or even 310 C or more). Surface roughness, Rq, of the material (measured by atomic force microscopy and WYKO—white light interferometry) was found to be 10 nm or less, and generally 5 nm or less. In many cases, the surface roughness is 1 nm or less. When the material is patterned, sidewalls are formed in the surface topography that is created. A measurement of the sidewall roughness (measured by atomic force microscopy, SEM and WYKO—white light interferometry) was found to be 50 nm or less, and generally 10 nm or less. Depending upon the compounds used for hydrolysis/condensation, as well as exposure and development technique, a sidewall roughness, Rq, or 5 nm or less, or even 1 nm or less, can be achieved. Patterning of the material was able to create feature sizes (e.g. ridge or trench width) as small as 100 nm or less, or even 50 nm or less, as well as aspect ratios of such features of 2:1, 3:1 or even as high as 10:1 (also measured by atomic force microscopy, SEM and WYKO—white light interferometry).

Due to the hydrophobic nature of some of the materials within the present invention (e.g. those having a higher degree of fluorination), it may be desirable in some cases to first provide an adhesion promoting layer before depositing the hybrid material. For example, a 1:100 dilution of the material of the invention could be applied as an adhesion promoting layer before spinning on (or otherwise depositing) the hybrid material. The diluted SOD is very stable (photo, thermal, humidity, 85/85 tests) and easy to detect, spreads well on Silicon and is optically clear all the way to UV Other adhesion promoting materials that could be used include Onichem organosilane G602, (N (beta aminoethyl)-gamma aminopropyl dimethyl siloxane (CA 3069-29-2)—high boiling, high RI(1.454), thermally stable low density and is compatible with acrylics, silicones, epoxies, and phenolics), or Dow AP8000, propyloxysilane (e.g. 3(2 3 epoxy propoxy propyl) trimethoxy silane), Ormocer (low viscosity), Halar, Orion/Dupont Teflon primer, trifluoroacetic acid, barium acetate, fluorethers (from Cytonix), PFC FSM 660 (a fluoroalkyl monosilane in a fluorinated solvent)—can be diluted to 0.1 to 0.05 percent in alcohol or fluorinated solvent, PFC FSM 1770 (a tri-fluoroalkyl monosilane in a fluorinated solvent, providing very low surface energy to oxide surfaces and good adhesion for fluoropolymers)—can be diluted to 0.1 to 0.05 percent in alcohol or fluorinated solvent, and/or HMDS.

The materials of the invention can be deposited as very thin layers (as thin as from 1 to 10 molecular layers), or in thicker films from 1 nm up to 100 um (or more). Generally, the material is deposited at a thickness of from 0.5 to 50 um, preferably from 1 to 20 um—though of course the thickness depends upon the actual use of the material (waveguide, passivation coating, adhesive, etc.). The thickness of the deposited layer can be controlled by controlling the material viscosity, solvent content and spinning speed (if deposited by spin on). Material thickness can also be controlled by adjusting the deposition temperature of both the deposition solution and the spinner (if spin on deposition). Also, adjusting the solvent vapor pressure and boiling point by selection of solvent can affect the thickness of the deposited material. Spin on deposition can be performed on a Karl Suss Cyrset enhanced RC8 spinner. Spray coating, dip-coating, meniscus coating, screen printing and "doctor blade" methods can also be used to achieve films of varying thickness.

This invention has been described in connection with the preferred embodiments. Many variations of the above embodiments are contemplated as being within the scope of the invention.

The invention claimed is:

1. A method for making a waveguide, comprising: providing a substrate; forming a lower cladding layer on the substrate; forming a core layer above the lower cladding layer; and forming an upper cladding layer above the core layer; wherein the lower cladding layer, core layer and upper cladding comprises a fully or partially fluorinated hybrid organic-inorganic material having an optical loss of less than 0.1 dB/cm at 1550 nm, and further wherein the difference in refractive index between the core and cladding layers is greater than 1%.

2. The method of claim 1, wherein the hybrid material is formed by depositing at a temperature of 200 C or less.

3. The method of claim 2, wherein the hybrid material is annealed after depositing, wherein the annealing is at a temperature of 200 C or less.

4. The method of claim 2, wherein the hybrid material is deposited at a temperature of 150 C or less.

5. The method of claim 1, wherein the substrate is an integrated circuit substrate.

6. The method of claim 1, wherein the substrate is a glass, quartz, semiconductor, ceramic or plastic substrate.

7. The method of claim 6, wherein the substrate is a glass or quartz substrate.

8. The method of claim 6, wherein the substrate is a semiconductor substrate.

9. The method of claim 8, wherein the substrate is a silicon or germanium substrate.

10. The method of claim 6, wherein the substrate comprises photonic and/or electronic circuitry thereon.

11. The method of claim 10, wherein the circuitry is formed on the substrate prior to depositing the lower cladding layer.

12. The method of claim 1, wherein the substrate is a printed circuit board.

13. The method of claim 1, wherein the hybrid layer has an optical loss of less than 0.09 dB/cm at 1550 nm.

14. The method of claim 13, wherein the hybrid layer has an optical loss of less than 0.075 dB/cm at 1550 nm.

15. The method of claim 1, wherein the hybrid layer has an optical loss of less than 0.1 dB/cm at 1310 nm.

16. The method of claim 1, wherein the hybrid layer has an optical loss of less than 0.1 dB/cm at C Band.

17. The method of claim 1, wherein the hybrid layer has an optical loss of less than 0.1 dB/cm at L Band.

18. The method of claim 14, wherein the hybrid layer has an optical loss of less than 0.05 dB/cm at 1550 nm.

19. The method of claim 15, wherein the hybrid layer has an optical loss of less than 0.075 dB/cm at 1310 nm.

20. The method of claim 16, wherein the hybrid layer has an optical loss of less than 0.075 dB/cm at C Band.

21. The method of claim 17, wherein the hybrid layer has an optical loss of less than 0.075 dB/cm at L Band.

22. The method of claim 1, wherein the deposited hybrid material is capable of being heated in supercritical water vapor at 2 atm and at 120 C for 2 hours after which optical absorption, polarization dependent loss and/or refractive index change remains unchanged ±5%.

23. The method of claim 1, wherein the hybrid material has a birefringence of less than 5×10e-5.

24. The method of claim 23, wherein the hybrid material has a birefringence of less than 2×10e-5.

25. The method of claim 24, wherein the hybrid material has a birefringence of less than 1×10e-6.

26. The method of claim 1, wherein the hybrid material is directly patterned to have a surface topography where the aspect ratio is at least 2:1.

27. The method of claim 26, wherein the hybrid material is directly patterned to have a surface topography where the aspect ratio is at least 3:1.

28. The method of claim 27, wherein the deposited hybrid material is directly patterned to have a surface topography where the aspect ratio is at least 10:1.

29. The method of claim 1, wherein the deposited hybrid material is deposited at a rate of 100 µm/min or more.

30. The method of claim 1, wherein the deposited hybrid material has a thickness of from 1 nm to 100 µm after a single deposition step.

31. The method of claim 30, wherein the deposited hybrid material has a thickness of from 0.5 µm to 50 µm after a single deposition step.

32. The method of claim 1, wherein the deposited hybrid material has a thickness of from 1 µm to 20 µm after a single deposition step.

33. The method of claim 1, wherein the hybrid material has a polarization dependent loss of 0.1 dB/cm or less.

34. The method of claim 33, wherein the deposited hybrid material has a polarization dependent loss of 0.05 dB/cm or less.

35. The method of claim 34, wherein the hybrid material has a polarization dependent loss of 0.01 dB/cm or less.

36. The method of claim 1, wherein the hybrid material has a glass transition temperature or 200 C or greater.

37. The method of claim 1, wherein the hybrid material is perfluorinated.

38. The method of claim 1, wherein the hybrid material is comprised of less than 10% H.

39. The method of claim 38, wherein the hybrid material is comprised of less than 5% H.

40. The method of claim 39, wherein the hybrid material is comprised of less than 1% H.

41. The method of claim 1, wherein the refractive index of the core layer and the lower and upper cladding layers is from 0.1% to 3%.

42. The method of claim 41, wherein the at least one lower and upper cladding layers and the core layer differ from each other in the organic and/or inorganic components.

43. The method of claim 1, wherein the hybrid material has a surface roughness Rq of 10 nm or less.

44. The method of claim 43, wherein the hybrid material has a surface roughness Rq of 5 nm or less.

45. The method of claim 44, wherein the hybrid material has a surface roughness Rq of 1 nm or less.

46. The method of claim 1, wherein the deposited hybrid material is patterned and has a sidewall roughness Rq of 50 nm or less.

47. The method of claim 46, wherein the hybrid material is patterned and has a sidewall roughness Rq of 10 nm or less.

48. The method of claim 47, wherein the hybrid material is patterned and has a sidewall roughness Rq of 5 nm or less.

49. The method of claim 48, wherein the hybrid material is patterned and has a sidewall roughness Rq of 1 nm or less.

50. The method of claim 1, wherein the hybrid material is patterned to form apertures and/or ridges having a feature size of 100 nm or less.

51. The method of claim 50, wherein the hybrid material is patterned to form apertures and/or ridges having a feature size of 50 nm or less.

52. The method of claim 1, wherein at least a portion of the hybrid material is a fluorinated organic moiety.

53. The method of claim 1, wherein at least a portion of the hybrid material is an inorganic moiety.

54. The method of claim 53, wherein the inorganic moiety is a metal oxide backbone.

55. The method of claim 1, wherein the hybrid material is deposited by spin coating, spray coating or dip coating.

56. The method of claim 55, wherein the hybrid material is deposited by spin coating.

57. The method of claim 55, wherein the hybrid material is deposited by spray coating.

58. The method of claim 1, wherein the deposited hybrid material has a hydrophobicity that results in a water contact angle of 100 degrees or more.

59. The method of claim 58, wherein the deposited hybrid material has a water contact angle of 125 degrees or more.

60. The method of claim 59, wherein the deposited hybrid material has a water contact angle of 150 degrees or more.

61. The method of claim 1, wherein the hybrid material is directly patterned by application of electromagnetic energy and a developer, prior to depositing the upper cladding layer.

62. The method of claim 1, wherein the hybrid material comprises an organic dopant or an inorganic liquid crystal dopant.

63. The method of claim 1, wherein the refractive index of the hybrid material is tunable by application of UV light, visible light, infrared light, X-rays, electron beam or ion beam prior to depositing the upper cladding layer.

64. The method of claim 1, wherein the deposited hybrid material has a glass transition temperature of 200 C or more.

65. The method of claim 64, wherein the deposited hybrid material has a glass transition temperature of 250 C or more.

66. The method of claim 65, wherein the deposited hybrid material has a glass transition temperature of 310 C or more.

67. The method of claim 1, wherein the deposited hybrid layer has a thermo-optic coefficient (dn/dT) greater than |10× 10e5|.

68. The method of claim 1, wherein the hybrid layer is directly patterned by exposure to electromagnetic energy via a gray scale mask, followed by removal of a portion of the hybrid layer with a developer.

69. The method of claim 1, wherein the hybrid layer is patterned, the patterning of the hybrid layer comprises directing electromagnetic energy at the hybrid layer followed by providing a developer to remove portions of the hybrid layer.

70. The method of claim 1, wherein the hybrid material is formed with a repeating -M-O-M-O- backbone having at least one organic substituent, the material having a molecular weight of from 500 to 10000, where M is boron, a metalloid or a metal, and O is oxygen.

71. The method of claim 70, wherein the molecular weight is from 1500 to 3000.

72. The method of claim 71, wherein the organic substituent is fully fluorinated.

73. The method of claim 72, wherein more than one different organic substituent is bound to the repeating -M-O-M-O -backbone, and wherein each organic substituent is fully or partially fluorinated.

74. The method of claim 73, wherein the hybrid material comprises organic cross linking groups between adjacent -M-O-M-O- strands.

75. The method of claim 70, wherein the organic cross linking groups are fully or partially fluorinated.

76. The method of claim 75, wherein the organic cross linking groups are perfluorinated groups.

77. The method of claim 70, wherein the at least one organic substituent is a single or multi ring aryl group or an alkyl group having 5 or more carbons.

78. The method of claim 77, wherein the aryl or alkyl group is fluorinated or deuterated.

79. The method of claim 78, wherein the aryl or alkyl group is fluorinated.

80. The method of claim 79, wherein the at least one organic substituent is a fluorinated phenyl or fluorinated $C_1$-$C_5$ alkyl group.

81. The method of claim 80, wherein the fluorinated phenyl group is substituted with fluorinated methyl, ethyl or alkenyl groups.

82. The method of claim 70, wherein M is B, Al, Si, Ge, Sn, Sb, Pb, Ta, Ti, Zr, Er, Yb and/or Nb.

83. The method of claim 82, wherein M is B, Al, Si, Ge, Sn, Sb or Pb.

84. The method of claim 83, wherein M is Ta, Ti, Zr or Nb.

85. The method of claim 84, wherein M is B, Al and/or Si.

86. The method of claim 70, wherein the at least one organic substituent is a straight or branched chain having 5 or more carbons.

87. The method of claim 70, wherein the at least one organic substituent is an aryl group that is a single ring or polycyclic aromatic substituent.

88. The method of claim 87, wherein the at least one organic substituent is a fully or partially fluorinated single ring or polycyclic aromatic substituent.

89. The method of claim 88, wherein the at least one organic substituent has one or two rings.

90. The method of claim 1, wherein the hybrid layer is deposited by spinning or spraying onto the substrate, the hybrid layer comprising a material having a molecular weight of from 500 to 10000.

91. The method of claim 90, further comprising baking the hybrid material after depositing onto the substrate.

92. The method of claim 91, wherein the material is exposed to the electromagnetic radiation via the gray scale mask so as to selectively further cross link the material and increase the molecular weight of the material in selected areas.

93. The method of claim 92, wherein the electromagnetic energy has a wavelength of from 13 nm to 700 nm.

94. The method of claim 92, wherein a developer is applied to remove material in unexposed areas.

95. The method of claim 90, wherein the material is deposited after mixing with a solvent.

96. The method of claim 95, wherein the solvent is selected from isopropanol, ethanol, methanol, THF, mesitylene, toluene, cyclohexanone, cyclopentanone, dioxane, methyl isobutyl ketone, or perfluorinated toluene.

97. The method of claim 85, wherein M is Si.

98. The method of claim 95, wherein the material is mixed with a solvent and a thermal initiator or photoinitiator prior to deposition.

99. The method of claim 98, wherein a photoinitiator is mixed with the material and solvent prior to spin on, the photoinitiator undergoing free radical formation when exposed to light so as to cause polymerization in the hybrid material.

100. The method of claim 93, wherein the electromagnetic energy is ultraviolet light.

101. The method of claim 100, wherein the ultraviolet light is directed on the hybrid layer via a mask so as to expose portions of the hybrid layer, and wherein the developer removes non-exposed portions of the hybrid layer.

102. The method of claim 1, further comprising providing a light emitter or photodetector on the substrate proximate to the waveguide.

103. The method of claim 102, wherein the photodetector is an avalanche photodiode or a PIN diode.

104. The method of claim 102, wherein the light emittor is a laser or LED.

105. The method of claim 102, wherein the laser is a VCSEL.

106. The method of claim 102, wherein the light emitter is a monolithic Fabry-Perot laser, a monolithic Bragg laser, a monolithic distributed feedback laser or a semiconductor quantum well laser.

107. The method of claim 102, wherein the light emittor is a single-frequency laser.

108. The method of claim 107, wherein the single frequency laser is a distributed feedback laser.

109. The method of claim 104, wherein the light emittor is a multi-frequency laser.

110. The method of claim 108, wherein the multi-frequency laser is an integrated cavity laser or an arrayed laser.

111. The method of claim 1, wherein the substrate is a semiconductor, glass or plastic substrate.

112. The method of claim 111, wherein the substrate is a silicon substrate.

113. The method of claim 1, wherein the waveguide is formed as a coupler between a fiber and a photodetector or light emitter.

114. The method of claim 70, wherein the hybrid material comprises fluorinated cross linking groups between M elements in a three dimensional -M-O-M-O- lattice.

115. The method of claim 114, wherein the organic cross linking group is fully fluorinated.

116. The method of claim 70, comprising three or more different organic groups bound to the M-O-M-O- backbone.

117. The method of claim 70, further comprising a dopant D that is a metalloid or early transition metal and is different from M, and is bound to the -M-O-M-O- lattice and alters the refractive index of the hybrid material compared to an -M-O-M-O -lattice without a dopant.

118. The method of claim 117, wherein the dopant is an early transition metal.

119. The method of claim 118, wherein the dopant is tantalum, zirconium, germanium or titanium.

120. The method of claim 117, wherein the dopant is a metalloid.

121. The method of claim 120, wherein the dopant is germanium.

122. The method of claim 1, wherein the deposited hybrid material is capable of being heated in supercritical water vapor at 2 atm and at 120 C for 2 hours after which optical absorption, polarization dependent loss and refractive index change remain unchanged ±5%.

123. The method of claim 1, wherein the deposited hybrid material is capable of being heated in supercritical water vapor at 2 atm and at 120 C for 2 hours after which the chemical structure of the hybrid material is less than 5% changed.

124. The method of claim 1, wherein the deposited hybrid material is capable of being heated in supercritical water vapor at 2 atm and at 120 C for 2 hours after which the chemical structure of the hybrid material is unchanged.

125. The method of claim 1, wherein the waveguide is part of an N-port splitter with cascading Y-couplers.

126. The method of claim 1, wherein the waveguide is part of a planar crossover.

127. The method of claim 1, wherein the waveguide is formed as part of an integrated optical circuit.

128. The method of claim 127, wherein the integrated optical circuit comprises one or more of a light emittor, a photodetector, an amplifier and a switch.

129. The method of claim 1, wherein the waveguide is formed within a multi-device assembly on a single substrate.

130. The method of claim 129, wherein the multi-device assembly is a wavelength division multiplexor receiver assembly.

131. The method of claim 130, wherein the wavelength division multiplexor receiver assembly comprises one or more arrayed waveguide gratings, an amplifier, and one or more PIN diode receivers.

132. The method of claim 129, wherein the multi-device assembly comprises a plurality of lasers, a plurality of external modulators, a combiner and amplifier.

133. The method of claim 1, further comprising fabricating a photodetector or light emittor proximate to the waveguide on the substrate.

134. The method of claim 1, further comprising dropping in a prefabricated photodetector or light emittor proximate to the waveguide.

135. The method of claim 1, wherein the waveguide is formed as a coupler between a fiber and either a photodetector or light emittor.

136. The method of claim 1, wherein the hybrid layer material is doped.

137. The method of claim 136, wherein the dopant is erbium.

138. The method of claim 1, wherein the waveguide formed is part of an EDFA.

139. The method of claim 138, wherein the EDFA is a multistage EDFA.

140. The method of claim 1, wherein the waveguide is part of a coupler.

141. The method of claim 140, wherein the coupler is a resonant coupler.

142. The method of claim 1, wherein the waveguide is part of a wavelength coupler or splitter.

143. The method of claim 1, wherein the waveguide is part of an isolator.

144. The method of claim 1, wherein the waveguide is a portion of a waveguide grating router.

145. The method of claim 1, wherein the waveguide is part of a filter, modulator or switch.

146. The method of claim 1, wherein the waveguide is within a gain compensator dev., integrated EDWA, monolithic DCM, reconfigurable OADM, or optical channel monitor.

147. The method of claim 1, wherein the waveguide is part of a concentrator chip, AWG multiplexor chip, thermo optic VOA, dispersion compensator, gain flattening filter, tunable waveguide grating, switch, coupler, modulator, waveguide polarizer, splitter, interleaver, isolator or tap.

148. The method of claim 1, wherein the hybrid material is a siloxane.

149. The method of claim 1, further comprising a passivation layer on the upper cladding layer.

150. The method of claim 70, wherein the hybrid material comprises between 2 and 6 different organic substituents on an inorganic three dimensional backbone matrix.

151. The method of claim 90, wherein the molecular weight is from 500 to 5000.

152. The method of claim 151, wherein the molecular weight is from 500 to 3000.

153. The method of claim 1, wherein the hybrid layer is patterned with a laser.

154. The method of claim 104, wherein the LED is an OLED.

155. The method of claim 1, wherein the hybrid material has an optical loss of 0.1 dB/cm at 1550 nm, is deposited at 200 C or less, a polarization dependent loss of 0.1 dB/cm or less and a surface roughness of 10 nm or less.

156. The method of claim 1, further comprising forming a buffer layer on the substrate before forming the lower cladding layer.

157. The method of claim 156, wherein the buffer layer has a hydrophobicity that results in a contact angle of 90 degrees or more if exposed to water.

158. The method of claim 1, wherein the core layer is formed by depositing a core material followed by patterning the core material to form an elongated core.

159. The method of claim 158, wherein the patterning of the core material is by direct ultraviolet light patterning.

160. The method of claim 1, wherein the waveguide formed is an optical waveguide for UV, visible and/or ultraviolet light.

161. The method of claim 1, wherein the hybrid material has a thickness of from 1 to 10 molecular layers.

162. The method of claim 70, wherein the repeating -M-O-M-O- backbone is a three dimensional matrix.

163. The method of claim 162, wherein both the core layer and the cladding layers have a repeating -M-O-M-O- backbone with organic substituents, but where one or more metals "M" in the core layer backbone are different or in different amounts than in the cladding layers.

164. The method of claim 162, wherein both the core layer and the cladding layers have a repeating -M-O-M-O -backbone with one or more organic substituents bound thereto, but where the one or more organic substutituents in the core layer are different or in different amounts than in the cladding layers.

165. A waveguide made by the method of claim 1.

* * * * *